(12) United States Patent
Lysaght et al.

(10) Patent No.: US 10,289,093 B1
(45) Date of Patent: May 14, 2019

(54) RUNTIME ADAPTIVE GENERATOR CIRCUIT

(71) Applicant: Xilinx, Inc., San Jose, CA (US)

(72) Inventors: Patrick Lysaght, Los Gatos, CA (US); Parimal Patel, San Antonio, TX (US); Yun Qu, Campbell, CA (US); Graham F. Schelle, Longmont, CO (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/850,659

(22) Filed: Dec. 21, 2017

(51) Int. Cl.
| | | |
|---|---|---|
| *G06F 7/38* | (2006.01) | |
| *H03K 19/173* | (2006.01) | |
| *G05B 19/045* | (2006.01) | |
| *G05B 19/042* | (2006.01) | |

(52) U.S. Cl.
CPC ....... *G05B 19/045* (2013.01); *G05B 19/0426* (2013.01); *G05B 2219/23289* (2013.01)

(58) Field of Classification Search
USPC ................................... 326/37–47
See application file for complete search history.

(56) References Cited

U.S. PATENT DOCUMENTS

| | | | | |
|---|---|---|---|---|
| 7,173,452 B2 * | 2/2007 | Folsom | ............... | G05B 19/045 326/46 |
| 2014/0279796 A1 * | 9/2014 | Dlugosch | .......... | G06F 15/17362 706/46 |

OTHER PUBLICATIONS

Eslami, Fatemeh. et al., "Enabling Effective FPGA Debug using Overlays: Opportunities and Challenges," Proc. of the 2nd Int'l. Workshop on Overlay Architectures for FPGAs (OLAF2016), Feb. 21, 2016, pp. 37-42.
Haenel, Valentin "Interfacing with C," [online] Scipy Lecture Notes [retrieved Aug. 11, 2017] retrieved from the Internet: <http://www.scipy-lectures.org/advanced/interfacing_with_c/interfacing_with_c.html>, pp. 1-31.
Catanzaro, Bryan et al., "SEJITS: Getting Productivity and Performance with Selective Embedded JIT Specialization," Programming Models for Emerging Architectures, vol. 1, No. 1, Oct. 2009, pp. 1-9.
Capalija, Devor et al., "Tile-based Bottom-up Compilation of Custom Mesh-of-Functional-Units FPGA Overlays," Proc. of the IEEE 24th Int'l. Conf. on Field Programmable Logic and Applications (FPL), Sep. 2, 2014, pp. 1-8, IEEE, Piscataway, New Jersey, USA.
Wikipedia, "Very high-level programming language," [online] Wikipedia, the free encyclopedia, Jun. 25, 2017, retrieved from the Internet: <https://en.wikipedia.org/w/index.php?title=Very_high-level_programming_language&oldid=787427362>, pp. 1-2.

(Continued)

*Primary Examiner* — Anh Q Tran
(74) *Attorney, Agent, or Firm* — Kevin T. Cuenot

(57) ABSTRACT

A system can include a finite state machine generator implemented in programmable circuitry of an integrated circuit. The finite state machine generator is parameterizable to implement different finite state machines at runtime of the integrated circuit. The system can include a processor configured to execute program code. The processor is configured to provide first parameterization data to the finite state machine generator at runtime of the integrated circuit. The first parameterization data specifies a first finite state machine and the finite state machine generator implements the first finite state machine in response to receiving the first parameterization data from the processor.

20 Claims, 10 Drawing Sheets

(56) References Cited

OTHER PUBLICATIONS

Amazon, "Amazon EC2 F1 Instances," [online] Amazon Web Services, Inc. © 2017 [retrieved Aug. 11, 2017], retrieved rom the Internet: <https://aws.amazon.com/ec2/instance-types/f1/>, pp. 1-14.
Alfke, Peter, "Creative Uses of Block RAM", WP335 (v1.0), Jun. 4, 2008, pp. 1-5, Xilinx, Inc., San Jose, California, USA.
Xilinx, "Creative Uses of Block RAM," WP335 (v1.0), Jun. 4, 2008, Xilinx, Inc., San Jose, California, USA.

* cited by examiner

RUNTIME ADAPTIVE GENERATOR CIRCUIT

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to implementing a runtime adaptive generator circuit within an IC.

BACKGROUND

Integrated circuits (ICs) can be implemented to perform a variety of functions. Some ICs can be programmed to perform specified functions. An example of an IC that can be programmed is a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA. Changing the functionality of the FPGA thereafter requires loading different configuration data into the configuration memory cells.

SUMMARY

One or more embodiments are directed to systems. A system can include a finite state machine generator implemented in programmable circuitry of an integrated circuit. The finite state machine generator is parameterizable to implement different finite state machines at runtime of the integrated circuit. The system can include a processor configured to execute program code. The processor is configured to provide first parameterization data to the finite state machine generator at runtime of the integrated circuit. The first parameterization data specifies a first finite state machine and the finite state machine generator implements the first finite state machine in response to receiving the first parameterization data from the processor.

One or more embodiments are directed to methods. A method can include implementing a finite state machine generator within programmable circuitry of an integrated circuit and receiving, at the finite state machine generator, first parameterization data at runtime of the integrated circuit. The first parameterization data specifies a first finite state machine. The method can include implementing the first finite state machine within the finite state machine generator at runtime of the integrated circuit in response to parameterizing the finite state machine generator using the first parameterization data.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
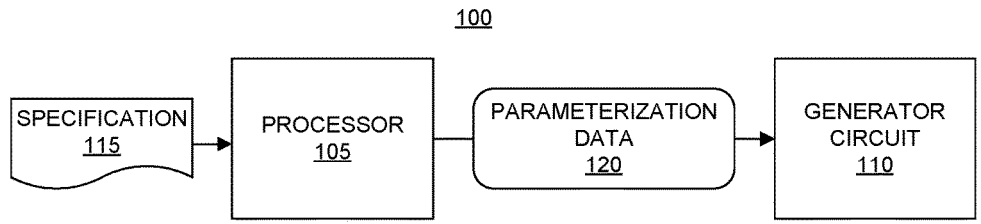
FIG. 1 illustrates an example system including a generator circuit.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to implementing one or more generator circuits. A generator circuit is implemented, at least in part, using programmable circuitry of an IC. The generator circuit, once implemented using the programmable circuitry by way of loading a configuration bitstream into the IC, may be parameterized at runtime of the IC for performing particular tasks, operations, or implementing particular types of circuits. The generator circuit is customizable at runtime of the IC through parameterization to implement different instances of particular types of circuits.

In one or more embodiments, the generator circuit is implemented as a finite state machine generator (FSMG). The FSMG is parameterizable to implement different finite state machines (FSMs) at runtime of the IC as needed and/or desired. The FSMG may be parameterized to implement different FSMs at runtime of the IC without the need to instantiate any new and/or different circuitry in the programmable circuitry of the IC for each different FSM to be implemented. The FSMG itself is capable of implementing any of a variety of different FSMs dynamically within the IC. The parameterization data provided to the FSMG specifies the particular FSMs to be implemented. As such, the FSMG is effectively programmed by the parameterization data to implement the different FSMs over time.

In one or more embodiments, the generator circuit is implemented as a Boolean function network generator (BFNG). The BFNG is parameterizable to implement different Boolean function networks at runtime of the IC as needed and/or desired. As defined herein, a Boolean function network is a circuit that implements two or more Boolean functions. Boolean function networks are described herein in greater detail below. The BFNG may be parameterized to implement different Boolean function networks at runtime of the IC without the need to instantiate any new and/or different circuitry in the programmable circuitry of the IC for each different Boolean function network to be implemented. The BFNG itself is capable of implementing any of a variety of different Boolean function networks dynamically within the IC. The parameterization data provided to the BFNG specifies the particular Boolean function networks to be implemented. As such, the BFNG is effectively programmed by the parameterization data to implement the particular Boolean function networks over time.

In one or more embodiments, the generator circuit, whether implemented as an FSMG and/or a BFNG, utilizes a processor. The processor is capable of executing program code that enables the processor to receive a specification as input and convert the specification into the parameterization data used to parameterize the generator circuit once implemented in programmable circuitry. In the case of an FSMG, for example, the specification defines a particular FSM. The parameterization data specifies the particular FSM defined by the specification, but is in a format that is loadable into and/or usable by the FSMG. Upon loading the parameterization data into the FSMG, the FSMG implements the particular FSM defined by the specification.

Thus, the FSMG is capable of implementing any of a variety of different FSMs dynamically during operation of the IC without the need to implement new and/or different circuitry in the IC for each different FSM that is implemented. As an example, a field programmable gate array (FPGA) type of programmable IC may be loaded with a configuration bitstream that implements the FSMG therein using programmable circuitry. Once implemented, the FSMG is parameterizable to implement different FSMs over time by loading suitable parameterization data.

For example, once a configuration bitstream is loaded into the IC to implement the FSMG, first parameterization data specifying a first FSM may be used to parameterize the FSMG. In response to the parameterization, the FSMG implements the first FSM. Subsequently, second and different parameterization data specifying a second and different FSM may be loaded into the FSMG, thereby causing the FSMG to implement the second FSM. This may be performed while the programmable circuitry of the IC continues to operate uninterrupted without implementing different physical circuitry corresponding to the second FSM.

In the case of a BFNG, for example, the specification defines a particular Boolean function network. The parameterization data specifies the particular Boolean function network defined by the specification, but is in a format that is loadable into and/or usable by the BFNG. Upon loading the parameterization data into the BFNG, the BFNG is capable of implementing the particular Boolean function network defined by the specification.

Thus, the BFNG is capable of implementing any of a variety of different Boolean function networks dynamically during operation of the IC without the need to implement new and/or different circuitry in the IC for each different Boolean function network that is implemented. As an example, an FPGA type of programmable IC may be loaded with a configuration bitstream that implements the BFNG therein using programmable circuitry. Once implemented, the BFNG is parameterizable to implement different Boolean function networks over time by loading suitable parameterization data.

For example, once a configuration bitstream is loaded into the IC to implement the BFNG, first parameterization data specifying a first Boolean function network may be used to parameterize the BFNG. In response to the parameterization, the BFNG implements the first Boolean function network. Subsequently, second and different parameterization data specifying a second and different Boolean function network may be loaded into the BFNG, thereby causing the BFNG to implement the second Boolean function network. This may be performed while the programmable circuitry of the IC continues to operate uninterrupted without implementing different physical circuitry corresponding to the second Boolean function network.

Conventional techniques for implementing FSMs and/or Boolean function networks rely upon creating a different configuration bitstream for each different FSM or for each different Boolean function network to be implemented within the IC. Thus, for the IC to switch from implementing a first FSM or Boolean function network to a second and different FSM or Boolean function network, a different configuration bitstream was loaded into the IC to create new circuitry corresponding to the new FSM or new Boolean function network.

In cases where an FSM and/or a Boolean function network is used in a larger circuit design under development and the FSM and/or Boolean function network is to be modified, conventional approaches require a complete reimplementation of the circuitry. The design flow for reimplementing a circuit design, however, may take hours to complete to generate the new configuration bitstream. In accordance with the inventive arrangements described herein, not only may different FSMs and/or Boolean function networks be implemented using the same generator circuit (e.g., FSMG or BFNG) thereby avoiding time consuming reimplementation, but aspects of a given FSM and/or Boolean function network such as the number of inputs, the number of outputs, or other parameters may be changed at runtime of the IC without regenerating the circuit design and/or implementing new and/or different circuitry.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a system 100 including a generator circuit 110. In the example of FIG. 1, system 100 includes a processor 105 and generator circuit 110. For purposes of illustration, generator circuit 110 is implemented in programmable circuitry of an IC. As an example, generator circuit 110 is implemented in the programmable circuitry of an FPGA.

Processor 105 is a circuit that is capable of executing program code. In one or more embodiments, processor 105 is an embedded processor implemented within the same IC that includes the programmable circuitry implementing generator circuit 110. In an example, processor 105 may be implemented as a hardwired processor embedded in the same IC as generator circuit 110. In another example, processor 105 may be implemented as a soft processor implemented using programmable circuitry like generator circuit 110. In the soft processor example, processor 105 may also be embedded in the same IC as generator circuit 110. In the case of a soft processor, processor 105 may be implemented by the same configuration bitstream used to implement generator circuit 110. In one or more other embodiments, processor 105 is implemented within a different system and/or IC than is generator circuit 110.

In the example of FIG. 1, for example, a configuration bitstream specifying generator circuit 110 and/or any interface circuitry that couples generator circuit 110 to processor 105 is loaded into a programmable IC. Loading the configuration bitstream into the programmable IC implements generator circuit 110 therein using the programmable circuitry. Generator circuit 110 is, in effect, a user programmable circuit block that is parameterizable (e.g., customizable) at runtime of the IC. As defined within this disclosure, the term "runtime" or "runtime of the IC" refers to a state of operation of a programmable IC where a configuration bitstream has been loaded into the programmable IC causing physical implementation of generator circuit 110 therein.

In one or more embodiments, processor 105 is capable of executing program code that causes processor 105 to process a specification 115 and generate parameterization data 120 from specification 115. Processor 105 may provide parameterization data 120 to generator circuit 110. In one or more embodiments, processor 105 is capable of generating parameterization data 120 at runtime.

For example, processor 105 is capable of executing an operating system and one or more applications. As an example, processor 105 is capable of executing a modern operating system such as Linux or another suitable operating system. The application(s) executed by processor 105 enable processor 105 to generate parameterization data 120 from specification 115.

Processor 105 is capable of loading generator circuit 110 with parameterization data 120 at runtime of the IC. While generator circuit 110 is implemented in the IC upon loading a configuration bitstream, generator circuit 110 is not operational until processor 105 provides parameterization data 120 to generator circuit 110. Once processor 105 provides parameterization data 120 to generator circuit 110, generator circuit 110 is capable of operating or running independently of other circuit blocks (and/or processor 105) within the IC.

In particular embodiments, where generator circuit 110 is an FSMG, specification 115 defines a particular FSM that is to be implemented by generator circuit 110. Processor 105 is capable of operating on specification 115 to generate parameterization data 120. Loading parameterization data 120 into generator circuit 110 causes generator circuit 110 to implement the particular FSM defined by specification 115. Processor 105 is capable of receiving different specifications, each defining a particular and/or different FSM, and generating corresponding parameterization data that can be loaded into generator circuit 110 at runtime of the IC to implement the particular FSM defined by the processed specification. In other embodiments, processor 105 is capable of receiving parameterization data from another source and/or system and loading the parameterization data into generator circuit 110.

In particular embodiments, where generator circuit 110 is a BFNG, specification 115 defines a Boolean function network that is to be implemented by generator circuit 110. Processor 105 is capable of operating on specification 115 to generate parameterization data 120. Loading parameterization data 120 into generator circuit 110 causes generator circuit 110 to implement the particular Boolean function network defined by specification 115. Processor 105 is capable of receiving different specifications, each defining a particular and/or different Boolean function network and generating corresponding parameterization data that can be loaded into generator circuit 110 at runtime of the IC to implement the particular Boolean function network defined by the processed specification. In other embodiments, processor 105 is capable of receiving parameterization data from another source and/or system and loading the parameterization data into generator circuit 110.

In one or more embodiments, specification 115 is a high-level software description of an FSM or a Boolean function network. Examples of high-level software descriptions for specification 115 can include, but are not limited to, high-level programming language (HLL), a high-productivity language (HPL), a markup language, or other suitable format.

Listing 1 is an example specification for an FSM. For purposes of illustration, the FSM specification of Listing 1 is specified using an HPL. The example of Listing 1 is specified in Python and, more particularly, as a Python dictionary.

LISTING 1

```
In [5]: fsm_spec_a = {'inputs': [('Clear', 'D0'), ('Direction', 'D1')],
    'outputs': [('alpha', 'D10'), ('beta', 'D11'), ('gamma', 'D12')],
    'states': ['S0', 'S1', 'S2', 'S3', 'S4', 'S5'],
    'reset_state': 'S0',
    'transitions':      [['00', 'S0', 'S1', '000'],
                         ['01', 'S0', 'S5', '000'],
                         ['00', 'S1', 'S2, '001'],
                         ['01', 'S1', 'S0', '001'],
                         ['00', 'S2', 'S3', '010'],
                         ['01', 'S2', 'S1', '010'],
                         ['00', 'S3', 'S4', '011'],
                         ['01', 'S3', 'S2', '011'],
                         ['00', 'S4', 'S5', '100'],
                         ['01', 'S4', 'S3', '100'],
```

LISTING 1

['00', 'S5', 'S0', '101'],
['01', 'S5', 'S4', '101'],
['1-', '*', 'S0', '000']]}

The FSM specification shown in Listing 1 defines an FSM called "fsm_spec_a". The FSM specification defines the inputs to "fsm_spec_a" as "Clear" and "Direction". The FSM specification uses tuples to associate an identifier or label with a particular pin of the IC (whether internal or an I/O pin of the IC). The "Clear" input to "fsm_spec_a" is assigned to the pin "D0". The "Direction" input is assigned to the pin "D1". The FSM specification further defines the outputs generated by "fsm_spec_a" as "alpha", "beta", and "gamma". The "alpha" output is assigned to pin "D10". The "beta" output is assigned to pin "D11". The "gamma" output is assigned to pin "D12". The FSM specification further defines the particular states to be included in "fsm_spec_a". The states are "S0", "S1", "S2", "S3", "S4", and "S5". In the example of Listing 1, the reset state is explicitly specified. In other embodiments, the processor is capable of interpreting the reset state as the first state listed in the series of states on line 3.

The FSM specification further defines each possible transition that makes up "fsm_spec_a". In the example of Listing 1, there are 13 transitions. Each transition is specified using four values. The first of the four values for a transition indicates the values received for the inputs to the FSM. The second of the four values for a transition indicates the current state of the FSM when the input values are received. The third of the four values for a transition indicates the next state of the FSM. The last of the four values for a transition indicates the output generated by the FSM. Thus, the first transition line having the values "00, S0, S1, 000" indicates that when the "Clear" input and the "Direction" input each have a value of "0" and the FSM is in state S0, the FSM outputs a value of "000". The first transition line further indicates that the FMS progresses from state S0 to state S1 as the next state.

The example of Listing 1 also illustrates that particular wildcards may be specified in the specification. For example, the last transition with the values "1-", "*", "S0", and "000" indicates that when "Clear" has a value of "1", regardless of the value of "Direction" or the current state, the FSM progresses to the reset state of "S0" and outputs a value of "000". Thus, wildcards can be defined and used in the specification for particular signals and/or states of the FSM.

Listing 2 is another example of an FSM specification. For purposes of illustration, the FSM specification of Listing 2 is specified using an HPL. The example of Listing 2 is specified in Python and, more particularly, as a Python dictionary.

LISTING 2

In [4]: fsm_spec_b= {'inputs': [('x', 'D0'), ('y', 'D1'), ('z', 'D2')],
'outputs': [('alpha', 'D5')],
'states': ['A', 'B', 'C'],
'reset_state': 'A',
'transitions':      [['1-', 'A', 'A', '0'],
                     ['-1-', 'B', 'C', '1'],
                     ['0-', 'A', 'B', '0'],
                     ['-0-', 'B', 'A', '1'],
                     ['-11', 'C', 'A', '0'],
                     ['-0', 'C', 'C', '0']]}

Processor 105 is capable of receiving an FSM specification at runtime of the IC as illustrated and described herein and generating parameterization data 120 that, when loaded into an FSMG, implements the particular FSM defined by the specification. Parameterization data 120 may include, for example, data that is loaded into various types of memories (e.g., block random access memories (BRAMs) and/or lookup tables), registers used to control multiplexers, and registers used to control switches and/or other circuitry.

Listing 3 is an example specification for a Boolean function network. For purposes of illustration, the Boolean function network specification of Listing 3 is specified using an HPL. In the example of Listing 3, the Boolean function network specification is specified using Python and, more particularly, as a Python list.

Listing 3 bool_funcs=['B11=A3^A5^A7^A11^A13',
    'B17=A2 & A4 & A8 & A10 & A12']
bool_gen.setup(bool_funcs)
bool_gen.run In the example of Listing 3, the Boolean function network specifies two Boolean functions. The first Boolean function defines an output of "B11" generated from 5 inputs which are "A3", "A5", "A7", "A11", and "A13". The first Boolean function, per the Boolean function network specification of Listing 3, is "A3 XOR A5 XOR A7 XOR A11 XOR A13". The second Boolean function has an output of "B17" generated from 5 inputs which are "A2", "A4", "A8", "A10", and "A12". The second Boolean function, per the Boolean function network specification of Listing 3, is "A2 AND A4 AND A8 AND A10 AND A12".

Processor 105 is capable of receiving a Boolean function network specification at runtime of the IC as illustrated and described herein and generating parameterization data 120 that, when loaded into a BFNG, implements the particular Boolean function network defined by the specification. Parameterization data 120 may include, for example, data that is loaded into various types of memories (e.g., block random access memories (BRAMs) and/or lookup tables), registers used to control multiplexers, registers used to control switches and/or other circuitry.

Figure 2:
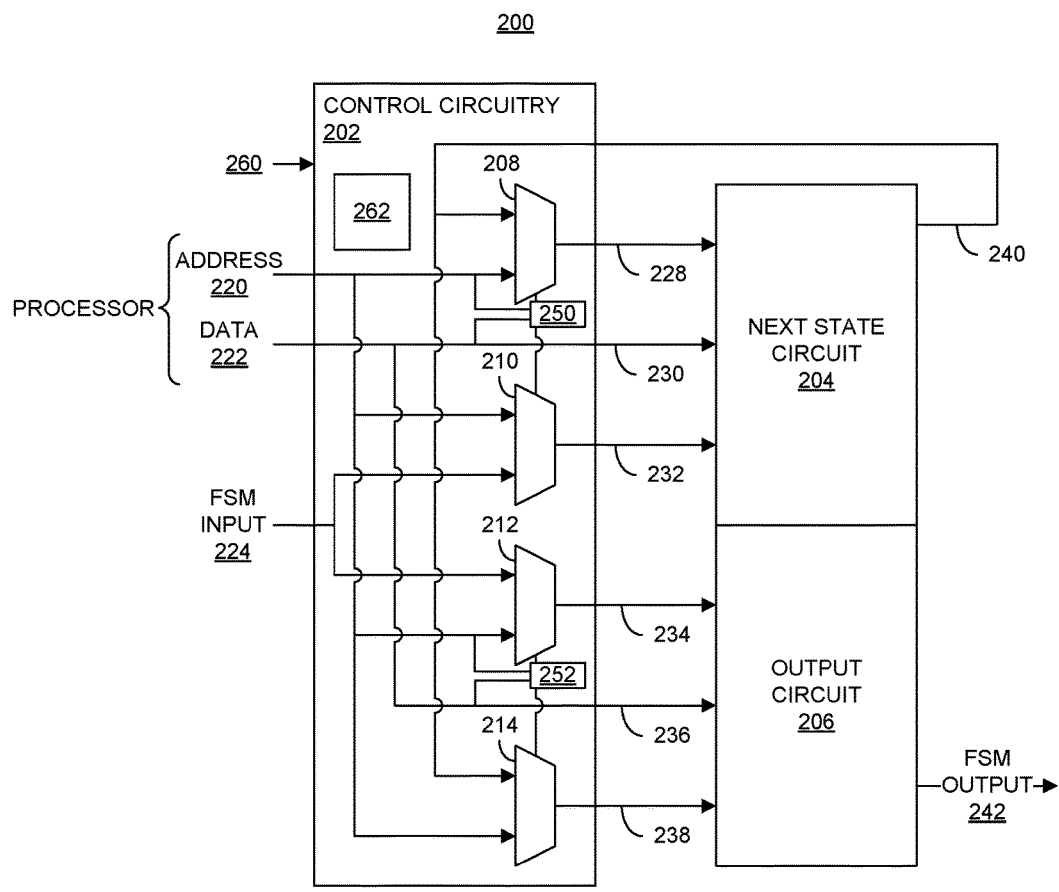
FIG. 2 illustrates an example implementation of a finite state machine generator (FSMG).

FIG. 2 illustrates an example implementation of an FSMG. In the example of FIG. 2, FSMG 200 is capable of implementing Moore type FSMs. FSMG 200 is customizable at runtime of the IC to implement different user specified FSMs. In one or more embodiments, generator circuit 110 of FIG. 1 may be implemented using FSMG 200. In the example of FIG. 2, FSMG 200 includes control circuitry 202, a next state circuit 204, and an output circuit 206.

In one or more embodiments, next state circuit 204 and output circuit 206 are implemented using one or more memories. In some cases, next state circuit 204 is also known as and/or referred to as "next state logic". In particular embodiments, next state circuit 204 and output circuit 206 are implemented as a single, dual port memory. As an illustrative and non-limiting example, next state circuit 204 and output circuit 206 may be implemented using a single block random access memory (BRAM) circuit available on a programmable IC. In another example, next state circuit 204 may be implemented using one or more BRAMs, while output circuit 206 is implemented using one or more BRAMs.

Regardless of the number of memories and/or BRAMs used, the contents stored in next state circuit 204 and output circuit 206 may be loaded at runtime using parameterization data provided to FSMG 200 to implement a particular FSM. New and/or different contents may be loaded into next state circuit 204 and/or output circuit 206 as may be desired or in response to particular conditions at any point during runtime. As such, each time FSMG 200 receives new and/or different parameterization data, FSMG 200 may be parameterized to implement a new and/or different FSM.

In the example of FIG. 2, next state circuit 204 and output circuit 206 are loaded at runtime with data from the parameterization data by multiplexing access to the address and/or data lines provided to each respective circuit structure. In a first mode of operation used to parameterize FSMG 200, the processor is capable of placing FSMG 200 in a hold or halted state. For example, the processor may place FSMG 200 in a halted state via signal 260. In the example of FIG. 2, the processor provides address signal 220 and data signal 222 to control circuitry 202. One or more bits of address signal 220 may be used to address or select registers 250 and 252, while one or more bits of data signal 222 are used to provide data to registers 250 and 252. Registers 250 and 252 are used to provide select signals to multiplexers 208, 210, 212, and 214. The select signals specify the particular bits (e.g., signals) that each respective multiplexer will pass.

In one or more other embodiments, registers 250 and 252 are loaded with data using a memory map interface and suitable signal decoding. The examples provided within this specification for loading parameterization data into registers 250 and 252 are for purposes of illustration and not limitation.

In the first mode of operation, the processor provides data to registers 250 and 252. Registers 250 and 252 provide select signals that cause control circuitry 202 to pass parameterization data on address signal 220 and data signal 222 to next state circuit 204 and/or output circuit 206. Registers 250 and 252 provide select signals that cause multiplexer 208 to pass address signal 220 as signal 228 to next state circuit 204 and cause multiplexer 210 to pass address signal 220 as signal 232 to next state circuit 204. Similarly, in the first mode of operation, the select signals cause multiplexer 212 to pass address signal 220 as signal 234 to output circuit 206 and cause multiplexer 214 to pass address signal 220 as signal 238 to output circuit 206.

In the first mode of operation, next state circuit 204 writes data received via data signal 222 from the processor to the addresses specified by address signal 220 (e.g., passed as signals 228 and 232). Similarly, output circuit 206 writes data received via data signal 222 from the processor to the addresses specified by address signal 220 (e.g., passed as signals 234 and 238).

In the example of FIG. 2, it should be appreciated that address signal 220 and data signal 222 are multibit signals. As such, one or more bits of address signal 220 may be provided to multiplexer 208, while one or more different bits of address signal 220 may be provided to multiplexer 210. Similarly, one or more bits of address signal 220 may be provided to multiplexer 212, while one or more different bits of address signal 220 may be provided to multiplexer 214. The bits provided to multiplexers 208 and 210 may be the same as or different from the bits provided to multiplexers 212 and 214. As such, same or different addresses may be provided to next state circuit 204 and output circuit 206. Data signal 222 is also a multibit signal so that the bits (data) provided to next state circuit 204 may be different than the bits (data) provided to output circuit 206.

In general, FSMG 200 is parameterized by loading the parameterization data into next state circuit 204 and output circuit 206. Once parameterized, FSMG 200 implements a particular FSM. Further FSMG 200 is capable of operating independently of the processor. With the contents of next state circuit 204 and output circuit 206 loaded, the processor is capable of providing data to registers 250 and 252 as described (e.g., a last portion of the parameterization data) to provide select signals to multiplexers 208, 210, 212, and 214 for proper configuration in the second mode of operation. Accordingly, the processor is capable of releasing FSMG 200 from the halted state. The processor may release FSMG 200 from the halted state via signal 260.

In the second mode of operation, FSMG 200 is capable of operating independently of the processor to implement the particular FSM specified by the parameterization data. In the second mode of operation, multiplexers 208, 210, 212, and 214 are configured, via the select signals, to pass one or more bits or all of FSM input signal 224 and/or state vector 240. Thus, in the second mode of operation, multiplexer 208 passes one or more bits of state vector 240 as signal 228 to next state circuit 204. Multiplexer 214 passes one or more bits of state vector 240 as signal 238 to output circuit 206. The number of bits of state vector 240 provided by each of multiplexers 208 and 214 is determined by the select signals from registers 250 and 252 (e.g., the parameterization data). In the second mode of operation, multiplexer 210 passes one or more bits of FSM input signal 224 as signal 232 to next state circuit 204. Multiplexer 210 passes one or more bits of FSM input signal 224 as signal 234 to output circuit 206. The number of bits of FSM input signal 224 provided by each of multiplexers 210 and 212 is determined by the select signals from registers 250 and 252 as programmed by the parameterization data.

In the second mode of operation, next state circuit 204 is capable of determining next states of the particular FSM now implemented by FSMG 200. Output circuit 206 is capable of generating FSM output signal 242. As an example, given an initial memory address specified by FSM input signal 224, next state circuit 204 outputs the value stored in next state circuit 204 at the specified memory address. The value read from the memory address specified by FSM input signal 224 is output as state vector 240. State vector 240 specifies, in part, the address corresponding to the next state of the FSM implemented by FSMG 200. Concurrently, given the initial memory address specified by FSM input signal 224, output circuit 206 outputs the value stored in output circuit 206 at the specified memory address. The value read from the memory address specified by FSM input signal 224 is output via FSM output signal 242.

FSMG 200 is capable of continued operation where the state vector 240 may be used in combination with memory addresses specified by FSM input signal 224 for next state circuit 204 and where state vector 240 is also used in combination with memory addresses specified by FSM input signal 224 for output circuit 206. The particular number of bits (e.g., width) of state vector 240 and FSM input signal 224 used by FSMG 200 depends upon the values stored in registers 250 and 252 to provide appropriate select signals to each of multiplexers 208, 210, 212, and 214.

In one or more embodiments, the BRAMs used to implement next state circuit 204 and output circuit 206 are pipelined and require two clock cycles from the start of operation, e.g., first receiving FSM input signal 224, for data to show up at the outputs (FSM output signal 242). To compensate for the pipelining, one or more dummy states may be provided. The dummy state(s) may be used within each implemented FSM following the reset state to compensate for pipelining in the BRAMs. In particular embodiments, the number of dummy states inserted into or implemented by the FSM may depend upon the amount of pipelining in the BRAMs. For example, the number of dummy states implemented by each FSM may be the number of pipeline stages of the BRAM(s) minus 1. As an illustrative and non-limiting example, a 2 clock cycle latency (e.g., 2 pipeline stages) in the BRAMs would utilize one dummy state, while a 3 clock cycle latency (e.g., 3 pipeline stages) in the BRAMs would utilize two dummy states. Once the FSM begins and passes through the dummy state(s), the dummy state(s) are only utilized if the FSM is reset and/or restarted from a particular or selected state.

In one or more embodiments, control circuitry 202 includes an additional control register, or registers, 262. Control register 262 may be written with parameterization data as described with the number of dummy states to implement for a given FSM. Though not shown, control register 262 may be written via signal 260, 220, 222, or another signal not shown that conveys parameterization data. In particular embodiments, control register 262 is capable of controlling operation of the FSM implemented by FSMG 200 to start in a particular or selected state as opposed to the reset state of the FSM implemented therein. The parameterization data may be written to control register 262 to specify the starting state.

At runtime of the IC, the processor is capable of halting operation of FSMG 200 and causing FSMG 200 to re-enter the first mode of operation to load second (e.g., new and/or different) parameterization data specifying a second (e.g., a new and/or different) FSM. The states, transitions, width of FSM input signal 224 and the width of state vector 240 used in implementing the second FSM may differ from the previously implemented FSM based upon the second parameterization data.

In one or more embodiments, the processor is capable of implementing different FSMs within FSMG 200 in response to different conditions. These conditions may relate to external (e.g., external to the IC) events detected by the processor, the input(s) and/or output(s) of the particular FSM implemented by FSMG 200, or other conditions detected within the IC itself.

In one or more other embodiments, the processor is capable of providing parameterization data to FSMG 200 via another mechanism. In an example, the processor is capable of providing parameterization data to FSMG 200 via the Processor Configuration Access Port (PCAP) of the IC. In another example, the processor is capable of providing parameterization data to FSMG 200 via the Internal Configuration Access Port (ICAP) of the IC.

Figure 3:
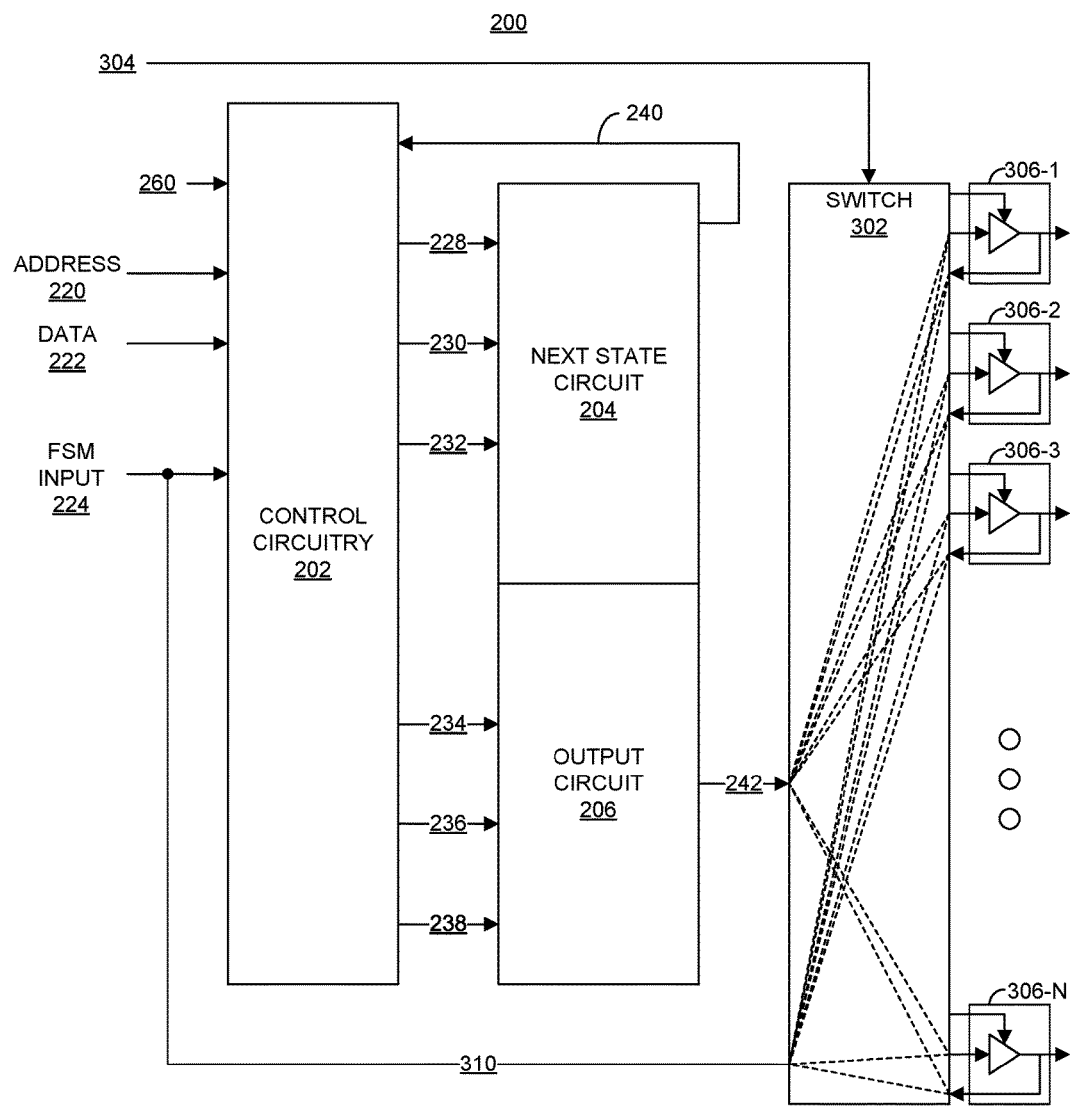
FIG. 3 illustrates another example implementation of an FSMG.

FIG. 3 illustrates another example implementation of FSMG 200. The example shown in FIG. 3 is substantially similar to the example of FIG. 2. In the example of FIG. 3, a switch 302 is included. FSMG 200 of FIG. 3 is also capable of implementing Moore type FSMs. Switch 302, like the other elements of FSMG 200 described in connection with FIG. 2, is runtime customizable using parameterization data. In particular, a processor such as processor 105 is capable of providing parameterization data to FSMG 200. The parameterization data is also capable of controlling operation of switch 302. The parameterization data may be provided to switch 302 via signal 304. For example, a processor such as processor 105 is capable of providing parameterization data to switch 302 via signal 304 during the first mode of operation. The parameterization data for switch 302 may be specified by the FSM specification previously described.

Switch 302 may include one or more registers that are loaded with data via signal 304. In the example of FIG. 3, signal 304 is provided from the processor, e.g., the same processor providing parameterization data to control circuitry 202, next state circuit 204, and output circuit 206. In one or more other embodiments, a different circuit and/or system is capable of providing parameterization data to switch 302 via signal 304. Such other circuit and/or system may operate in a coordinated manner with the processor.

Referring to switch 302, the parameterization data may program the registers, included therein, to cause each instance of circuit block 306 to operate as an input or as an output. Each of circuit blocks 306 is coupled to a node of a circuit design implemented within the IC. In one or more embodiments, the nodes coupled to circuit blocks 306 are external pins of the IC that may be connected to an interface for communicating with other systems and/or devices located off-chip. In one or more other embodiments, the nodes connected to circuit blocks 306 are internal pins of a circuit design implemented within the IC. In particular embodiments, one or more of the nodes connected to circuit blocks 306 are external pins while one or more other nodes connected to circuit blocks 306 are internal pins.

Switch 302 may also include one or more ports on the left side. For example, switch 302 may include an input port that is connected to FSM output signal 242. Switch 302 may include one or more output ports that are connected to signal 310. In the example of FIG. 3, signal 310 is connected to FSM input signal 224. For example, signal 310 may be provided to FSMG 200 as an input.

The parameterization data provided to switch 302 is further used to connect different instances of circuit block 306 to different ports on the left side of switch 302. In this manner, any instance or instances of circuit block 306 may be configured as an input and connected to signal 310. Similarly, FSM output signal 242 may be connected to any instance or instances of circuit block 306 that is configured as an output.

In particular embodiments, switch 302 may include more instances of circuit block 306 than the sum of the bit width of FSM input signal 224 and FSM output signal 242. By including additional capacity in switch 302, more signals than are needed for any given FSM can be connected to switch 302 as may be needed. Subsequently, at runtime in the IC, different ones of the signals provided to instances of circuit block 306 may be used for different FSMs implemented by FSMG 200 over time based upon the parameterization data that is provided to FSMG 200.

As an example, switch 302 may include one instance of circuit block 306 coupled to each of pins D0-D19 (e.g., a 20-pin interface). Each instance of the circuit block 306 remains coupled to the same pin despite implementing different FSMs. For example, when implementing fsm_spec_a of Listing 1, pins D0 and D1 are used as inputs to the FSM. Pins D0 and D1 are coupled to particular instances of circuit block 306 of switch 302. Pins D10, D11, and D12 are used as outputs of the FSM and are coupled to particular instances of circuit block 306 of switch 302. The parameterization data provided to switch 302 configures the instances of circuit block 306 coupled to pins D0 and D1 as inputs and connects the instances of circuit block 306 so pin D0 and D1 are connected to FSM input signal 224. The parameterization data further configures switch 302 so that the instances of circuit block 306 coupled to pins D10, D11, and D12 are configured as outputs and configures the switch to connect the instances of circuit block 306 corresponding to pins D10, D11, and D12 to FSM output signal 242.

FSMG 200 is capable of operating as a standalone FSM in the programmable circuitry of the IC once parameterized. Subsequently, in response to a detected condition, the processor is capable of reconfiguring FSMG 200 to implement fsm_spec_b of Listing 2. When implementing fsm_spec_b of Listing 2, pins D0, D1, and D2 are used as inputs to the FSM. Pins D0, D1, and D2 are coupled to the same instances circuit block 306 of switch 302 as was the case when implementing fsm_spec_a. Pin D5 is used as the output of the FSM and is coupled to the same instance of circuit block 306 of switch 302 as was the case for fsm_spec_a. The parameterization data provided to switch 302 parameterizes the instances of circuit block 306 coupled to pins D0, D1, and D2 as inputs and connects the instances of circuit block 306 so that pins D0, D1, and D2 are connected to FSM input signal 224. The parameterization data provided to switch 302 further configures switch 302 so that the instance of circuit block 306 coupled to pin D5 is configured as an output and connects the instance of circuit block 306 corresponding to pin D5 to FSM output signal 242.

In this example, the various instances of circuit block 306 remain connected to the same pins. Each instance of circuit block 306, however, is individually configurable at runtime to function as an input or an output. Further, each instance of circuit block 306 may be coupled to FSM input signal 224 and/or to FSM output signal 242. These changes may be implemented by the processor by providing different parameterization data to FSMG 200.

In the examples of FIGS. 2 and 3, once the FSMG is instantiated within the IC, FSMG 200 includes a fixed number of available inputs and outputs. Through parameterization of FSMG 200 as described, the number of individual (e.g., bit-level) inputs and outputs may be varied but may not exceed the maximum number provided. Similarly, the size of the memory is limited to that initially instantiated.

For purposes of illustration and not limitation, consider an example FSMG that includes 13 bits of input and 32 bits of output. If the FSMG is coupled to a 20-pin interface (e.g., via switch 302), the total number of inputs and outputs for any FSM implemented by FSMG 200 must not exceed to 20. Thus, not all of the available inputs and outputs of FSMG 200 may be used.

Table 1 illustrates different example FSMs that may be implemented by FSMG 200 by way of parameterization when switch 302 is coupled to a 20-pin interface. As shown, the number of inputs and outputs for FSMs can be varied. The maximum number of states also varies with the input/output architecture. For example, the bottom row specifies an FSM with 32 possible states. The 32 states require 5 address bits. This allows FSMG 200 to receive 8 inputs (13-5). In keeping with the total number of 20 I/O pins, 12 of the available 32 outputs may be used. If more than 32 states are needed, an additional address bit is needed to obtain up to 64 states. This reduces the number of inputs to 7 (13-6), but frees up an additional output thereby resulting in 13 outputs. While example of Table 1 is tailored to use an FSMG as described in connection with FIG. 3 with a 20-pin interface, it should be appreciated that the FSMG may be scaled smaller or larger depending upon the number of pins that may be needed.

TABLE 1

| Maximum Inputs | Maximum States | Maximum Outputs |
| --- | --- | --- |
| 4 | 512 | 16 |
| 5 | 256 | 15 |

TABLE 1-continued

| Maximum Inputs | Maximum States | Maximum Outputs |
| --- | --- | --- |
| 6 | 128 | 14 |
| 7 | 64 | 13 |
| 8 | 32 | 12 |

In one or more embodiments where one or more dummy states are used, the maximum number of states may be reduced by the number of dummy states needed. For example, if one dummy state is needed, referring to the bottom row in the example of Table 1, the maximum number of inputs is 8, the maximum number of outputs is 12, but the maximum number of states is 32-1 or 31. In general, the memory may be partitioned so that the needed number of dummy states are available and partitioned off from the portion of the memory made available for implementing user states for the FSM. The number of dummy states partitioned off within next state circuit 204 and output circuit 206 may be specified by control register 262 as described.

Figure 4:
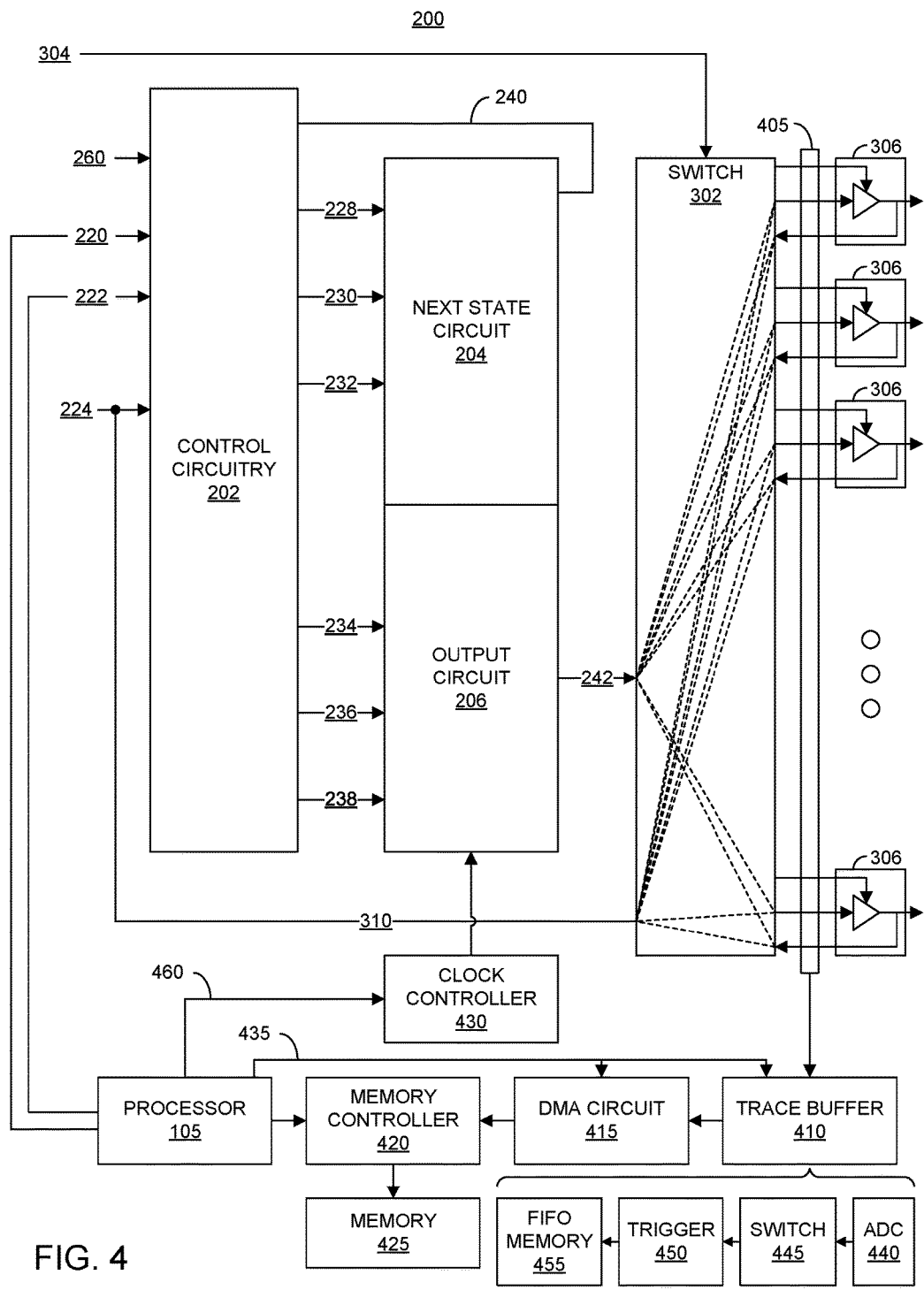
FIG. 4 illustrates another example implementation of an FSMG.

FIG. 4 illustrates another example implementation of FSMG 200. The example shown in FIG. 4 is substantially similar to the example of FIG. 3, with the exception that additional trace circuitry and clock control circuitry is included. FSMG 200 of FIG. 4 is also capable of implementing Moore type FSMs.

In the example of FIG. 4, the trace circuitry includes signal capture circuitry 405, trace buffer 410, and direct memory access (DMA) circuit 415. Signal capture circuitry 405 represents signal connections where the input and output signals for each instance of circuit block 306 are routed or coupled to trace buffer 410. Signal capture circuitry 405, for example, illustrates that the inputs and/or outputs of switch 302 may be coupled to trace circuitry for various types of monitoring activities that may be performed during runtime of the IC. Signal capture circuitry 405 is implemented using the programmable circuitry of the IC.

In the example of FIG. 4, trace buffer 410 is implemented using the programmable circuitry of the IC. As such, trace buffer 410, along with signal capture circuitry 405, may be is implemented with, or as part of, FSMG 200. Trace buffer 410 is capable of implementing probe capability. In the example of FIG. 4, trace buffer 410 can include an optional analog-to-digital converter (ADC) 440, an optional switch 445, an optional trigger circuit 450, and a first-in-first-out (FIFO) memory 455. Trace buffer 410 is capable of receiving one or more signals coupled to switch 302, whether analog or digital. Analog signals may be digitized using ADC 440. Switch 445 is capable of passing selected signals from ADC 440 and/or from switch 302 on to trigger circuit 450. Trigger circuit 450 is capable of evaluating received signals for particular conditions or trigger events. The signals may be stored in FIFO memory 455, e.g., in response to detecting a particular trigger event.

Trace buffer 410 is coupled to DMA circuit 415. DMA circuit 415 is capable of interacting with a memory controller 420. In one or more embodiments, DMA circuit 415 is implemented using programmable circuitry of the IC. In one or more other embodiments, DMA circuit 415 is hardwired in the IC. DMA circuit 415 is capable of reading data, e.g., trace data, from FIFO memory 455 and writing the trace data to memory 425 via memory controller 420. Memory controller 420 may be located on-chip with FSMG 200 or off-chip for reading and/or writing to memory 425.

Memory 425 is implemented as a read-write memory. In one or more embodiments, memory 425 is implemented on-chip. In one or more other embodiments, memory 425 is implemented off-chip. In particular embodiments, memory 425 is implemented as a RAM that is suitable for use by a processor during execution of program code (e.g., dynamic RAM or "DRAM", synchronous DRAM or "SDRAM", and double data rate RAM or "DDR RAM"). In the example of FIG. 4, processor 105 is capable of configuring FSMG 200 as described and is also capable of accessing memory 425 via memory controller 420.

For example, processor 105 is capable of controlling operation of trace buffer 410 via signal 435. Signal 435 may carry parameterization data to control operation of the different circuit blocks located within trace buffer 410. For example, if ADC 440 is included in trace buffer 410, processor 105 is capable of controlling operation of ADC 440. Processor 105, for example, is capable of changing the sampling rate of ADC 440 and/or the resolution of samples generated by ADC 440 (e.g., the number of bits of each sample) via the loading of parameterization data.

Processor 105 is capable of controlling operation of switch 445 by providing parameterization data via signal 435. Switch 445 is capable of receiving a first set of signals from switch 302 and any digitized signals passed from ADC 440. In one or more embodiments, ADC 440 may receive signals other than those input to or output from switch 302. Switch 445 is capable of passing a selected subset of signals to trigger circuit 450. The particular subset of signals passed to trigger circuit 450 by switch 445 is determined by processor 105 by way of the parameterization data provided via signal 435. Inclusion of switch 445 allows a larger number of signals to be coupled to trace buffer 410 that can be probed.

For example, trace buffer 410 may only be able to actively monitor a limited number of signals, e.g., 64 signals. More than 64 signals may be routed from various sources of the IC including switch 302 to switch 445. Switch 445, which may be implemented as one or more multiplexers, can be controlled, during operation, by signal 435 from processor 105 to determine or select which of the signals are to be passed to trigger circuit 450. In this manner, an application executed by processor 105 is capable of choosing which of the signals are monitored by trace buffer 410 and under what conditions (e.g., at runtime) such signals are to be monitored by providing new and/or updated parameterization data. In particular embodiments, processor 105 is capable of instructing switch 445 as to which signals to pass at runtime, e.g., in real-time, to dynamically change the particular signals that are probed or evaluated at any given time.

Trigger circuit 450 is capable of monitoring the signals passed by switch 445 to detect particular conditions. In particular embodiments, processor 105 is capable of controlling trigger circuit 450. For example, processor 105 is capable of arming (e.g., starting) and disarming (e.g., stopping) operation of trigger circuit 450 via signal 435. In one or more embodiments, processor 105 is capable of specifying the conditions that trigger circuit 450 monitors for via signal 435. Processor 105, for example, is capable of providing instructions to trigger circuit 450 specifying the conditions to be detected in order to store sample signals through the parameterization data. As such, the conditions used by trigger circuit 450 can be changed and/or updated by processor 105 during runtime by providing new and/or updated parameterization data. In particular embodiments, trigger circuit 450 is capable of continually storing sampled signals in FIFO memory 455 as opposed to storing sampled signals only in response to detecting particular conditions.

DMA circuit 415 reads the sampled signal(s) from FIFO memory 455 and writes the sampled signals to memory 425 as trace data. Once armed and operating, trigger circuit 450 is capable of storing samples of the signal or signals within FIFO memory 455. FIFO memory 455 is capable of performing write mismatch resolution. On the input side of FIFO memory 455 at trigger circuit 450, signals may be sampled at a high rate. For example, signals may be sampled at approximately 100 MHz continuously. At the back end of FIFO memory 455 at DMA circuit 415, DMA circuit 415 reads the trace data from FIFO memory 455 and writes the trace data to memory 425. DMA circuit 415 is capable of accessing a port on memory controller 420. Since other circuits are capable of accessing memory 425 via memory controller 420, there may be contention for writing data to memory 425. FIFO memory 455 alleviates backpressure in the event that sampled signals must be temporarily stored until DMA circuit 415 is able to continue writing data to memory 425.

In one or more embodiments, processor 105 is capable of controlling operation of DMA circuit 415. Processor 105, for example, is capable of instructing DMA circuit 415 to begin writing data to memory 425 and/or stop writing data to memory 425 via signal 435. Further, processor 105 is capable of specifying the particular addresses of memory 425 to which trace data is to be written. In one or more embodiments, processor 105 is capable of dynamically allocating space in memory 425 for storing trace data. Processor 105 is capable of informing or instructing DMA circuit 415 of the allocated address range to be used in memory 425 for storing trace data. Processor 105 is capable of reading and processing trace data from memory 425. Inclusion of FIFO memory 455 facilitates increased throughput to memory 425.

In moving data from FIFO memory 455 (e.g., programmable circuitry) to memory 425, the data moves from a physical memory space (in programmable circuitry) to a memory management unit (MMU) managed virtual memory space. Memory that is addressable by processor 105, for example, is a virtual memory address and an MMU (not shown) handles the virtual page tables. In programmable circuitry, there is no MMU. Memory addresses in programmable circuitry are physical memory addresses. In one or more embodiments, DMA circuit 415 is capable of performing memory domain crossing by translating between virtual memory addressing and physical memory addressing.

In one or more embodiments, when allocating space within memory 425, processor 105 is capable of executing a utility that is capable of reserving a portion of contiguous memory in memory 425. The reserved portion is removed from the virtual memory and is no longer managed by the MMU. Once reserved, the portion of memory becomes addressable physical memory. In particular embodiments, processor 105 receives a pointer to the portion of memory and provides the pointer to DMA circuit 415. DMA circuit 415 accesses memory 425 via the port of memory controller 420 using the memory address received from processor 105. Once finished writing data, DMA circuit 415 is capable of informing processor 105 that data is ready and may be read.

Processor 105 is capable of analyzing trace data stored in memory 425. In one or more embodiments, the trace data is stored in the portion of memory 425 that is allocated for trace buffer 410. The portion of memory may be the reserved portion of memory that is no longer managed by the MMU, at least until the portion of memory is re-allocated or de-allocated by processor 105. Processor 105, for example, is capable of executing a program specified in a high-level programming language. The program may specify the particular analysis of the trace data to be performed by processor 105. Accordingly, processor 105 is capable of performing any of a variety of different actions in response to detecting predetermined conditions within the trace data.

In one or more embodiments, with data rates sufficiently low, processor 105 is capable of analyzing the trace data from memory 425 in real time. In one or more other embodiments, where data rates are higher, processor 105 is capable of analyzing the trace data from memory 425 in near real time or substantially real time.

In one or more embodiments, processor 105 is capable of implementing different FSMs within FSMG 200 in response to detecting particular conditions in the trace data. In one or more embodiments, processor 105 is capable of controlling switch 445 to pass different probed signals to trigger circuit 450 in response to detecting particular conditions from the trace data. In one or more embodiments, processor 105 is capable of providing a visualization of the trace data to a data processing system.

In the example illustrated in FIG. 4, the trace circuitry (e.g., circuit block 405 and trace buffer 410) are implemented as part of FSMG 200. As FSMG 200 is updated to implement different FSMs, data from the FSM specification such as pin label data may be used and applied to the trace data interpreted or processed by processor 105 from memory 425. This alleviates the need for the user to re-enter data to interpret trace results.

In one or more embodiments, the trace circuitry may be used to verify correct operation of a given FSM as implemented by FSMG 200. For example, processor 105 may generate the parameterization data for an FSM from an FSM specification. Processor 105 may parameterize FSMG 200 using the parameterization data. In using the trace circuitry at runtime, the trace data includes the signal values of inputs and/or outputs of the FSM. Processor 105 is capable of analyzing the trace data to verify that the FSM, as implemented by FSMG 200, is operating as expected, e.g., correctly, by comparing the expected behavior of the FSM with the actual trace data collected for the FSM implemented by FSMG 200. Any anomalies found in the trace data, e.g., mismatches between expected values of trace data and the actual trace data, may be documented by processor 105 by storing a record of the anomaly in memory 425 and/or by generating an exception.

In a particular embodiment, if a sufficient number of pins are available, the state vector signal may be coupled to switch 302 and/or to switch 445 so that the state vector bits may be included in the trace data and analyzed. As such, the trace vector bits may also be used or incorporated into a trigger event or condition.

In another example, when there is not a sufficient number of pins and as part of a test mode, state vector 240 may be multiplexed onto the output pins of FSMG 200. For example, one or more additional multiplexers may be included in FSMG 200 so that state vector 240 may be multiplexed with FSM output signal 242 so that state vector 240 may be passed as output to switch 302 and be collected as trace data from time-to-time, periodically, or in response to a particular condition or instruction. In another example, as part of a test mode, output circuit 206 may be programmed by changing some of the data stored therein to contain FSM state vector data instead of output signal values. In that case, output circuit 206 outputs state vector 240 on FSM output signal 242 as opposed to the typical output.

In the example of FIG. 4, a clock controller 430 is also included. Clock controller 430 is capable of controlling the clock signal provided to next state circuit 204 and to output circuit 206. In the example shown, clock controller 430 is controlled by processor 105 via signal 460. Processor 105, for example, is capable of providing instructions to clock controller 430, which in turn is capable of adjusting the frequency of the clock signal provided to next state circuit 204 and output circuit 206. In this example, clock controller 430 is software controllable by processor 105.

In one or more embodiments, processor 105 is capable of controlling clock controller 430 via signal 460 to single step the clock of FSMG 200 or to multi-step the clock of FSMG 200. The ability to single step or multi-step the clock of FSMG 200 facilitates increased control when developing a system and/or performing debugging. This ability is further enhanced in that processor 105 may execute suitable development software that allows processor 105 to receive user instructions to initiate single stepping of the clock and/or multi-stepping of the clock in accordance with user preference.

In one or more embodiments, signal 460 may be provided by a source other than processor 105. In particular embodiments, signal 460 may be provided from another portion of a user circuit design (e.g., internal nodes), an I/O interface (e.g., by an external source), and/or by any combination of the foregoing.

FIG. 4 illustrates various use cases where trace circuitry may be used for testing purposes and/or during normal operation of the IC. In one or more embodiments, an FSMG may be used as a dedicated trigger unit for a logic analyzer. For example, FSMG 200 may be used to detect a particular operating state of the IC and/or another system coupled to the IC and, in response to detecting the state, initiate operation of the logic analyzer. The logic analyzer may be triggered by FSMG 200 implementing a particular FSM and reaching a particular state. The logic analyzer, however, may begin to store trace data collected from other signals once triggered using FSMG 200.

In one or more embodiments, an FSMG may be programmed using a domain specific language in which advanced trigger conditions are specified (e.g., as an FSM to be loaded into FSMG 200). As such, FSMG 200, in implementing the FSM, is capable of specifying when to arm an integrated logic analyzer, which signals to capture, when to stop signal capture, and/or when to re-arm the integrated logic analyzer to capture other events and/or sequences. FSM output signal 242, for example, may be provided to the integrated logic analyzer where the output from FSMG 200 controls the particular actions taken.

For example, a logic analyzer often has a trigger circuit that is programmable to detect particular conditions prior to initiating the start of data collection. In particular embodiments, FSMG 200 may implement a particular FSM and be used as a dedicated trigger unit for the logic analyzer. In that case, rather than provide an FSM specification as described herein, a domain specific language may be used to describe the desired behavior of the trigger. In many cases, triggers utilize a domain specific language (DSL) for defining the conditions that are to be detected. In accordance with the inventive arrangements described herein, the DSL description of the trigger behavior may be provided to a processor, which then generates the parameterization data for the FSM to be implemented by the FSMG 200 to implement the trigger with the desired behavior. The resulting FSM would control when to arm logic analyzer, what to capture, and the like.

Figure 5:
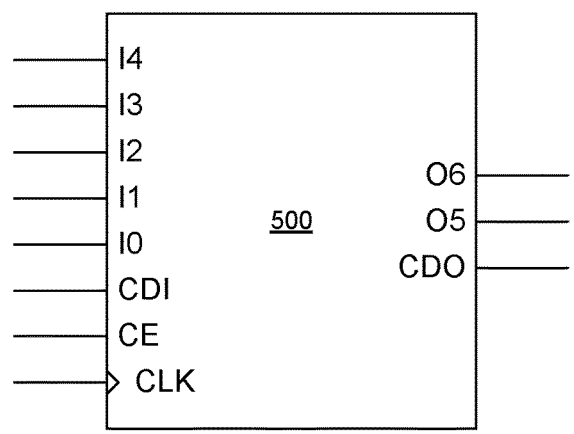
FIG. 5 illustrates an example of a lookup table circuit that is configurable at runtime of an IC.

FIG. 5 illustrates an example of a lookup table (LUT) 500 that is configurable at runtime of an IC. LUT 500 is dynamically reconfigurable to change the logic function implemented by LUT 500 during circuit operation. In the example of FIG. 5, LUT 500 includes 5 inputs labeled I0, I1, I2, I3, and I4. New data can be loaded into LUT 500 during operation, e.g., without loading a configuration bitstream into the IC, through the CDI input. New data can be synchronously shifted into LUT 500 serially to change the logical function implemented by LUT 500.

LUT 500 further includes an output O5 and another output O6. The O6 output produces the logical output function based on the current data loaded within LUT 500 and the currently selected I0-I4 inputs. LUT 500 may also be configured to use the O5 output in combination with the O6 output to create two individual 4-input functions sharing the same inputs or a 5-input function and a 4-input function that uses a subset of the 5-input logic.

The CDO pin of LUT 500 allows two or more such LUT structures to be cascaded by connecting the CDO pin from LUT 500 to the CDI input of the next instance of LUT 500, and so forth. Thus, multiple LUT 500 instances can be chained together by coupling the CDO pins to the CDI pins as described to enable the plurality of LUT 500 instances to be loaded with new data to implement new and/or different logic functions by loading a single serial chain of data. For example, 32-bits of data is used to configure each instance of LUT 500.

Figure 6:
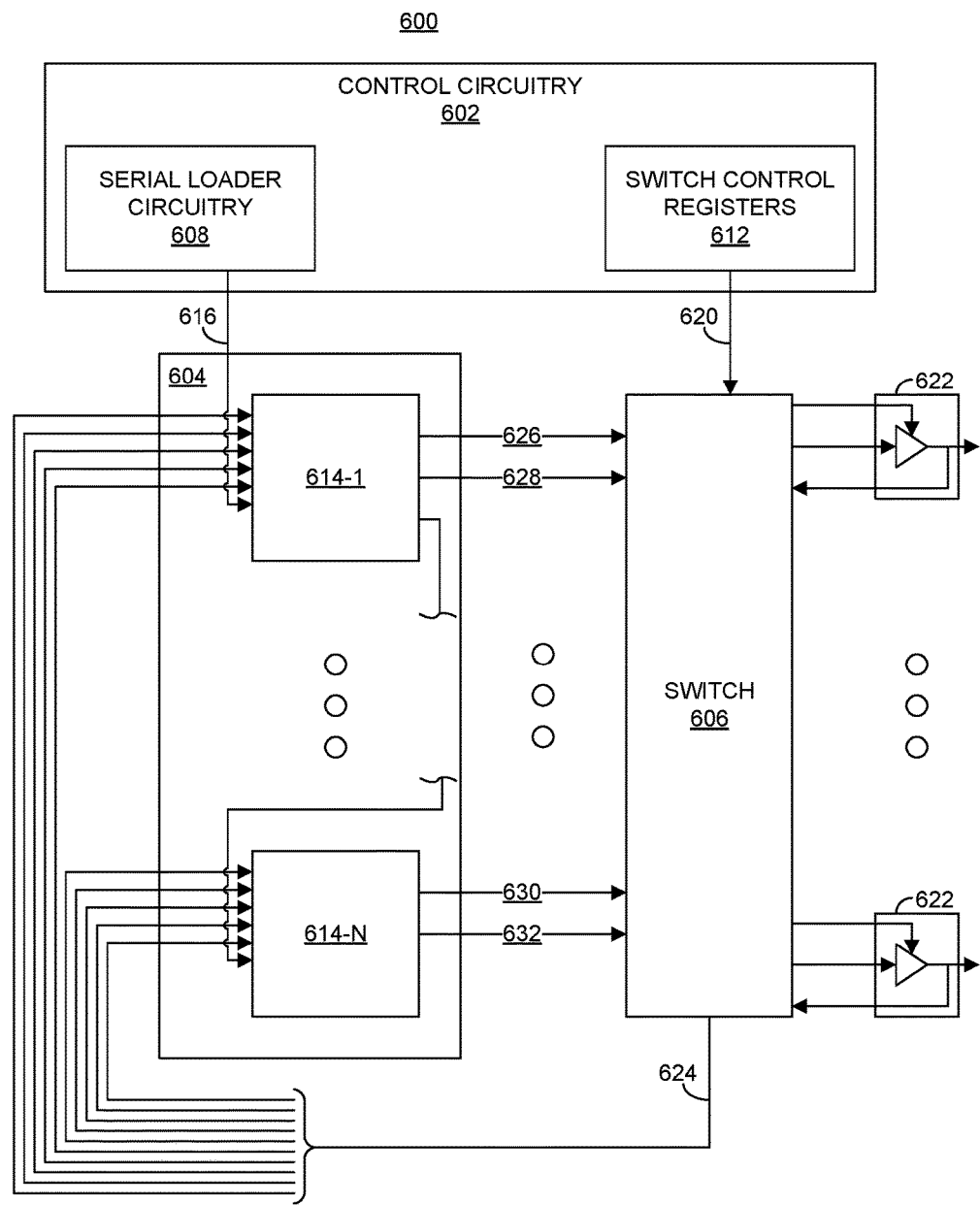
FIG. 6 illustrates an example implementation of a Boolean function network generator (BFNG).

FIG. 6 illustrates an example implementation of a Boolean function network generator (BFNG) 600. In the example of FIG. 6, BFNG 600 is parameterizable at runtime of the IC to implement different user specified Boolean function networks. In one or more embodiments, generator circuit 110 of FIG. 1 may be implemented using BFNG 600. In the example of FIG. 6, BFNG 600 includes control circuitry 602, a LUT circuit 604, and a switch 606.

BFNG 600 is parameterizable at runtime of the IC through the loading of parameterization data from a processor. In the example of FIG. 6, the processor, e.g., processor 105, is capable of providing parameterization data to control circuitry 602. As an example, the processor is capable of receiving a specification as described in connection with FIG. 1. The specification defines a Boolean function network that is to be implemented by BFNG 600. The processor generates parameterization data from the specification. The processor is capable of loading the parameterization data into control circuitry 602 to implement the Boolean function network defined by the specification. The parameterization data provided to control circuitry 602 includes the data that is used to control LUT circuit 604, the data that is loaded into the LUTs included within LUT circuit 604, and the data used to control switch 606.

In the example of FIG. 6, control circuitry 602 includes serial loader circuitry 608 and switch control registers 612. LUT circuit 604 includes one or more LUTs 614-1 through 614-N. In particular embodiments, LUTs included in LUT circuit 604 (e.g., LUTs 614-1 through 614-N) are implemented as described in connection with FIG. 5. Serial loader circuitry 608 is capable of providing the data that is loaded into the individual LUTs 614-1 through 614-N through signal 616. The data loaded into the individual LUTs 614-1 through 614-N defines the particular Boolean function performed by each respective one of LUTs 614. In one or more embodiments, the parameterization data provided to serial loader circuitry 608 and loaded into LUTs 614 via signal 616 specifies the minterms of the Karnaugh map that is loaded into each respective one of LUTs 614.

In one or more embodiments, serial loader circuitry 608 provides the data to the CDI input of LUTs 614 via signal 616. For example, signal 616 can be coupled to the CDI input of LUT 614-1 and output from the CDO output of LUT 614-1 and provided to the CDI input of the next LUT, e.g., LUT 614-N of LUT circuit 604. In such embodiments, serial loader circuitry 608 is capable of loading LUTs 614 serially in a daisy chain manner.

In one or more other embodiments, serial loader circuitry 608 is capable of providing multiple independent signals 618, where each different one of signals 618 signal is provided to a different group of one or more LUTs 614. In that case, serial loader circuitry 608 is capable of including two or more different serial loader circuits where each different serial loader circuit is capable of providing data to a group of two or more LUTs 614. In such embodiments, the time to load LUTs 614 is reduced by a factor equivalent to the number of different serial loaders (and LUT groups) used.

Switch control registers 612 are capable of controlling the configuration of switch 606. Switch 606 may be implemented substantially similar to, or the same as, switch 302 of FIG. 3. For example, switch control registers 612 are capable of providing signal 620 to switch 606. Based upon signal 620, each instance of circuit block 622 is configured as an input or as an output. Further, signal 620 specifies which of the ports illustrated on the left edge and on the bottom edge of switch 606 are coupled to different instances (e.g., the particular instance) of circuit block 622.

In one or more embodiments, switch 606 is further parameterizable to electrically isolate particular signals received from LUT circuit 604. For example, based upon the parameterization data, switch 606 is capable of isolating signal 626, 628, 630, and/or 632. When isolated, switch 606 does not propagate the isolated signal to another port and/or instance of circuit block 622.

LUT circuit 604 includes a plurality of LUTs 614-1 through 614-N, where "N" is an integer value of 1 or more. In the example of FIG. 6, LUTS 614 are arranged in parallel with a single stage. In one or more other embodiments, LUTs 614 may be arranged in multiple stages where a first stage of a plurality of parallel LUTs 614 receives input signals 624 (e.g., from switch 606) and a second stage of LUTs 614 receive input signals from the output signals of the first stage of LUTs 614 (e.g., signals 626, 628, 630, and/or 632).

In the example of FIG. 6, signals received by selected instances of circuit block 622 of switch 606 are routed and output from switch 606 as signals 624 and provided to the inputs of LUTs 614. Similar to the example of switch 302, instances of circuit blocks 622 of switch 606 may be coupled to internal nodes of the IC, to I/O pins of the IC, or to a combination of both internal nodes and I/O pins of the IC. Similarly, switch 606 is configurable to route one or more or all of signals 626, 628, 630, and/or 632 to different instances of circuit block 622.

The inclusion of switch 606 allows the inputs provided to BFNG 600 to be selected at runtime and the output provided from BFNG 600 to be selected at runtime based upon the parameterization data that is provided to control circuitry 602 and, in particular, to switch 606. Further, the particular Boolean function network performed by LUT circuit 604 is determined at runtime based upon the parameterization data provided to control circuitry 602.

In the example of FIG. 6, control circuitry 602, LUT circuit 604, and switch 606 may be implemented using programmable circuitry of the IC. As such, BFNG 600 may be created within an IC by loading a configuration bitstream specifying the circuit design therein. Once implemented, BFNG 600 is parameterizable (e.g., customizable) at runtime of the IC to implement different Boolean function networks over time without implementing different circuitry within the IC.

Though not pictured in the example of FIG. 6, additional circuitry including, but not limited to, signal capture circuitry 405, trace buffer 410, and DMA circuit 415 may be included as part of BFNG 600. In this regard, the particular configuration of BFNG 600 may be modified to implement one or more different Boolean function networks via the loading of parameterization data in response to results output from the BFNG 600. For example, a processor is capable of monitoring the trace data stored in a memory and, in response to detecting the condition, implement a different Boolean function within BFNG 600.

Figure 7:
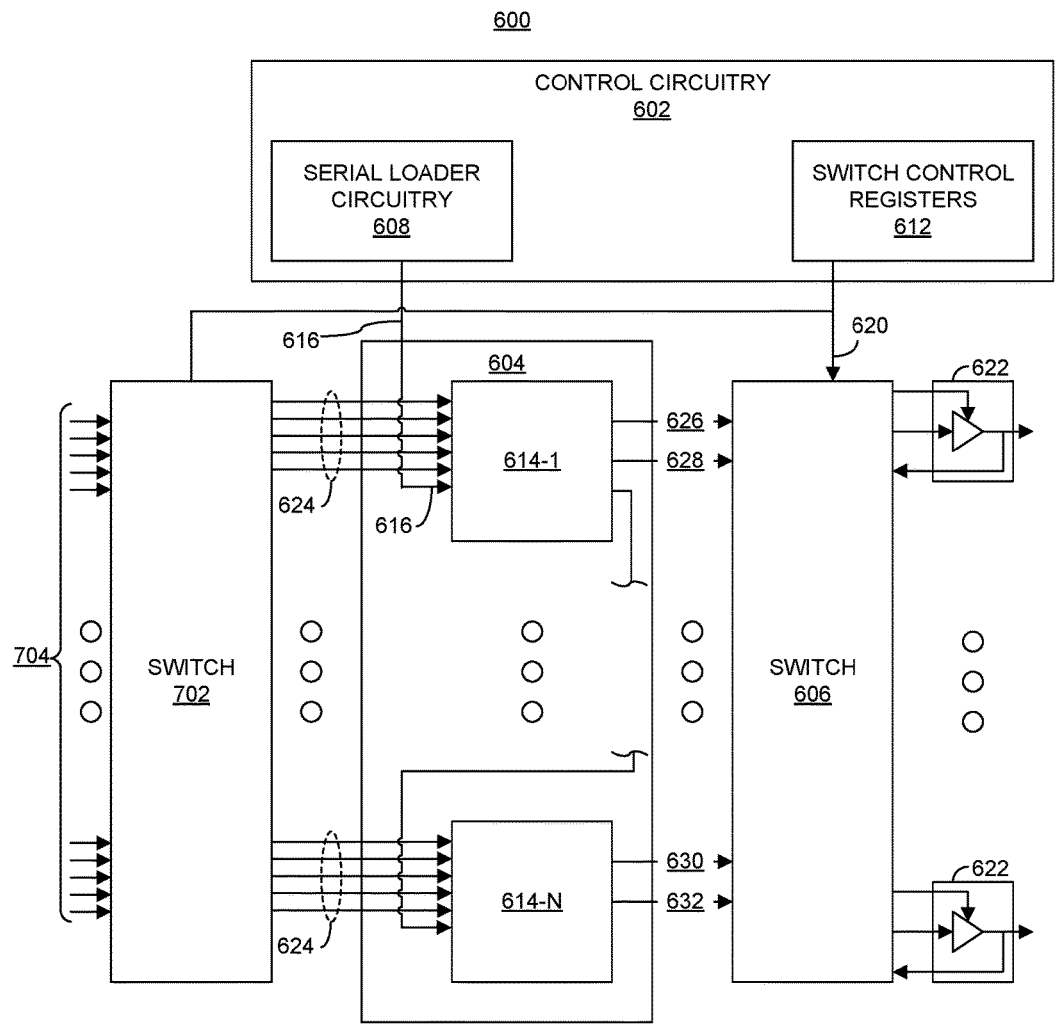
FIG. 7 illustrates another example implementation of a BFNG.

FIG. 7 illustrates another example implementation of BFNG 600. The example shown in FIG. 7 is substantially similar to the example of FIG. 6. In the example of FIG. 7, an additional switch 702 is included. Switch 702 is capable of coupling selected signals 704 to selected signals 624. In the example of FIG. 7, a separate input switch (e.g., switch 702) and a separate output switch (switch 606) are used. Switch 702, like switch 606, may be parameterized via parameterization data. Different nodes may be coupled to signals 704, e.g., internal nodes, I/O pins, or a combination of both, to connect the nodes to signals 624 as inputs to BFNG 600 based upon the parameterization data provided.

In the example of FIG. 7, control circuitry 602, LUT circuit 604, switch 606, and switch 702 may be implemented using programmable circuitry of the IC. As such, BFNG 600 may be created within an IC by loading a configuration bitstream specifying the circuit design therein. Once implemented, BFNG 600 is parameterizable (e.g., customizable) at runtime of the IC to implement different Boolean function networks over time without having to implement different circuitry within the IC.

Though not pictured in the example of FIG. 7, additional circuitry including, but not limited to, signal capture circuitry 405, trace buffer 410, and DMA circuit 415 may be included as part of BFNG 600. In this regard, the particular configuration of BFNG 600 may be modified to implement one or more different Boolean function networks via the loading of parameterization data in response to results output from the BFNG 600. For example, a processor is capable of monitoring the trace data stored in a memory and, in response to detecting the condition, implement a different Boolean function within BFNG 600.

Figure 8:
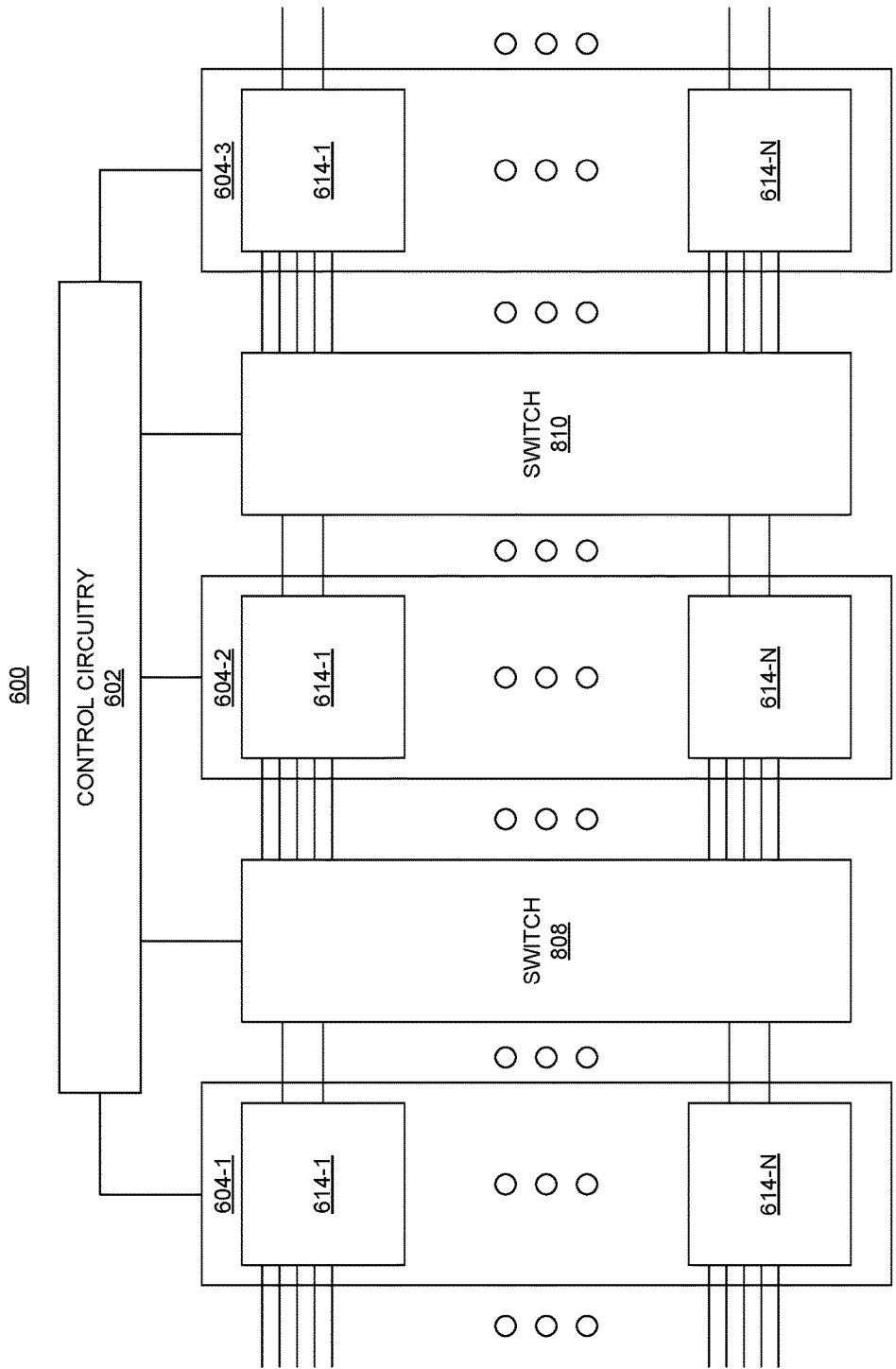
FIG. 8 illustrates another example implementation of a BFNG.

FIG. 8 illustrates another example implementation of a BFNG 600. In the example of FIG. 8, BFNG 600 includes multiple stages of LUT circuits 604. For purposes of illustration, BFNG 600 includes LUT circuits 604-1, 604-2, and 604-3. It should be appreciated that BFNG 600 may include fewer LUT circuits or more LUT circuits than shown. Each of LUT circuits 604 is coupled to the next stage LUT circuit 604 via a switch. LUT circuit 604-1 is coupled to LUT circuit 604-2 via switch 808. LUT circuit 604-2 is coupled to LUT circuit 604-3 via switch 810.

Each of switches 808 and 810 is customizable at runtime of the IC via control circuitry 602. Control circuitry 602 is capable of providing control signals to couple selected inputs of switch 808 to selected outputs of switch 808 and to couple selected inputs of switch 810 to selected outputs of switch 810. Each of LUT circuits 604 is customizable at runtime of the IC via control circuitry 602 to implement different Boolean functions. For ease of illustration, details of control circuitry 602 are not shown. Control circuitry 602, however, may include control registers for controlling each of LUT circuits 604 and each of switches 808 and 810. A processor is capable of providing the parameterization data to control circuitry 602 during runtime of the IC.

In the example of FIG. 8, the various circuit blocks illustrated for BFNG 600 may be implemented using programmable circuitry of the IC. As such, BFNG 600 of FIG. 8 may be created within an IC by loading a configuration bitstream specifying the circuit design therein. Once implemented, BFNG 600 is parameterizable (e.g., customizable) at runtime of the IC to implement different Boolean function networks over time without having to implement different circuitry within the IC.

Though not pictured in the example of FIG. 6, additional circuitry including, but not limited to, signal capture circuitry 405, trace buffer 410, and DMA circuit 415 may be included as part of BFNG 600. In this regard, the particular configuration of BFNG 600 may be modified to implement one or more different BFs via the loading of parameterization data in response to results output from BFNG 600. For example, a processor is capable of monitoring the trace data stored in a memory and, in response to detecting the condition, implement a different Boolean function network within BFNG 600.

FIGS. 6-8 are provided for purposes of illustration and not limitation. As described, BFNG 600 may include one or more stages of LUT circuit 604 and one or more stages of switches separating the LUT circuit stages. A BFNG as described herein may have a first stage that is a LUT circuit or a first stage that is a switch. The LUT circuit and switches may be arranged in alternating fashion. The BFNG further may have a last stage that is a LUT circuit or a switch. For example, BFNG 600 of FIG. 8 may include a switch at the input on the left that feeds LUT circuit 604-1 and may include a switch at the output on the right that is fed by LUT circuit 604-3.

Figure 9:
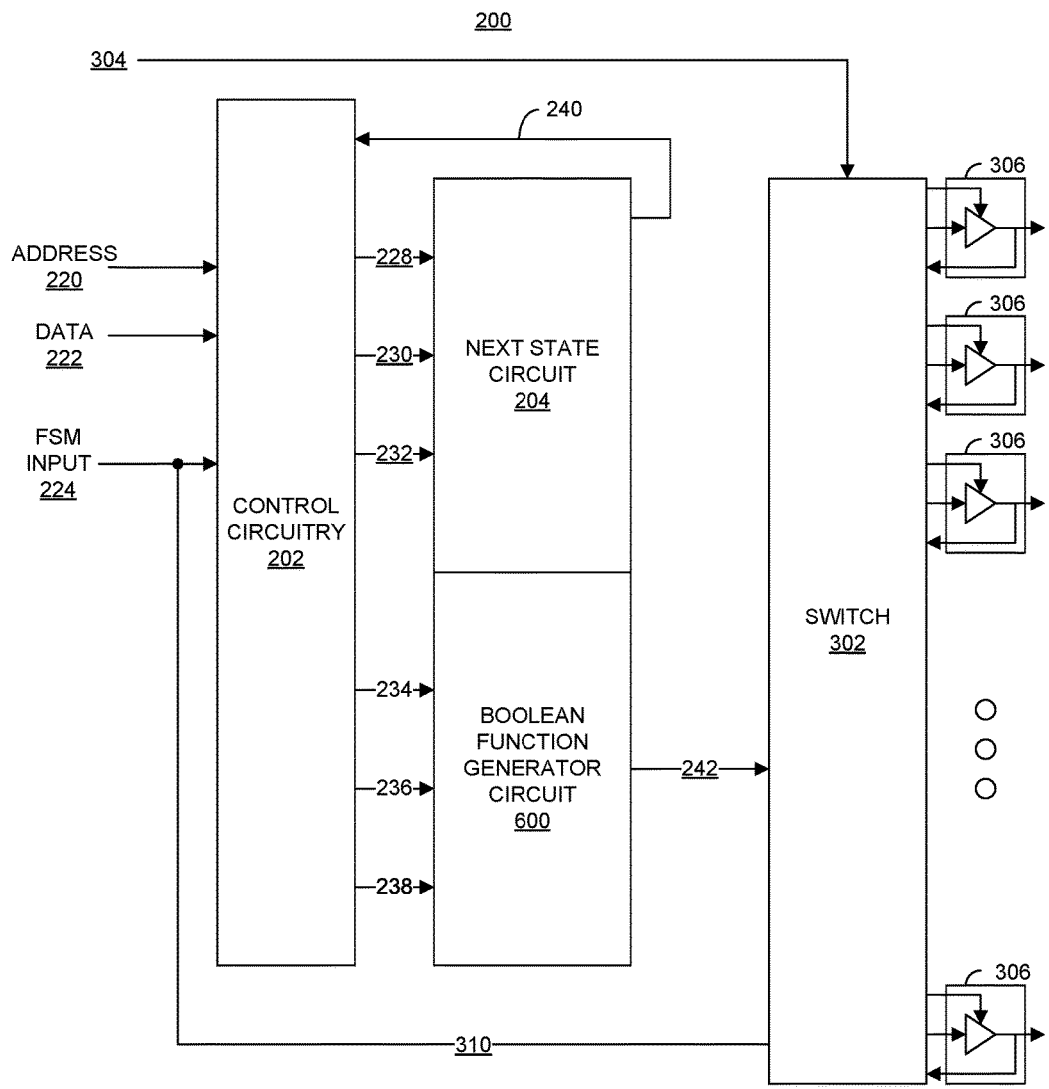
FIG. 9 illustrates another example implementation of an FSMG.

FIG. 9 illustrates another example implementation of FSMG 200. In the example of FIG. 2, FSMG 200 is capable of implementing Mealy type FSMs. FSMG 200 is parameterizable at runtime of the IC to implement different user specified FSMs. In one or more embodiments, generator circuit 110 of FIG. 1 may be implemented using FSMG 200 of FIG. 9. In the example of FIG. 2, FSMG 200 includes control circuitry 202, a next state circuit 204, BFNG 600, and switch 302. The parameterization data parameterizes control circuitry 202, next state circuit 204, switch 302, and BFNG 600.

In the example of FIG. 9, FSMG 200 operates substantially similar to the example implementations of FSMG 200 of FIGS. 2, 3, and/or 4. Next state circuit 204 receives signals 228, 230, and 232. Output circuit 206 is implemented as BFNG 600 instead of a memory (e.g., a BRAM) as previously described. In the example of FIG. 9, BFNG 600 receives signals 234, 236, and 238. As such, BFNG 600 receives one or more bits of state vector 240 and one or more bits of FSM input signal 224. BFNG 600 is capable of implementing a Boolean function network that operates on the received signals.

Though not pictured in the example of FIG. 9, additional circuitry including, but not limited to, signal capture circuitry 405, trace buffer 410, and DMA circuit 415 may be included within FSMG 200. In this regard, the particular configuration of FSMG 200, including BFNG 600, may be modified to implement one or more different FSMs via the loading of parameterization data. The parameterization data may be loaded in response to results output from the FSMG 200. For example, a processor is capable of monitoring the trace data stored in a memory and, in response to detecting a particular the condition in the trace data, implement a different FSM within FSMG 200. In the example of FIG. 9, implementing different FSMs entails implementing different Boolean function networks using BFNG 600.

Figure 10:
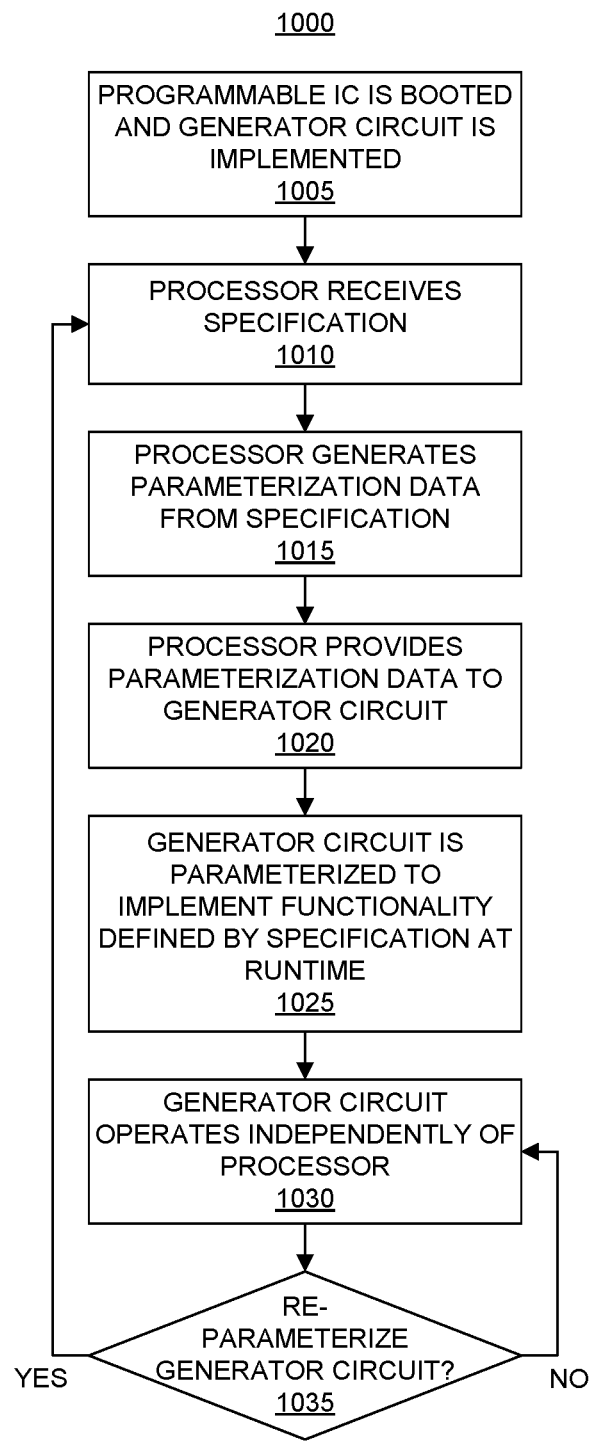
FIG. 10 illustrates an example method of implementing and using a generator circuit.

FIG. 10 illustrates an example method 1000 of implementing and using a generator circuit. FIG. 10 may be performed by a processor and a programmable IC as described herein. In one or more embodiments, the processor is embedded within the programmable IC. The processor may be implemented as a hardwired processor or as a soft-processor. In one or more other embodiments, the processor is external to the programmable IC.

In block 1005, the programmable IC is booted and the generator circuit is implemented. For example, the programmable IC is powered on. Further, a configuration bitstream that specifies the generator circuit is loaded into the programmable IC. With the configuration bitstream loaded into the programmable IC and the generator circuit (e.g., the FSMG and/or the BFNG) implemented within the programmable circuitry of the programmable IC, the IC is considered to be in a runtime state. It should be appreciated that any interface circuitry that couples the generator circuit to a processor and/or other circuit nodes within the programmable IC is also implemented by virtue of loading the configuration bitstream. For example, the generator circuit may be included within a larger circuit design implemented within the programmable IC.

In block 1010, the processor optionally receives a specification. The processor is capable of executing program code such as an operating system and various applications. An application executed by the processor is capable of receiving a specification for an FSM or a specification for a Boolean function network. The specification may be read from a memory, e.g., a runtime memory, accessible to the processor and/or may be received from another remote system or device.

In one or more embodiments, the processor is capable of performing one or more verification operations on the received specification. As an example, the processor is capable of determining whether the number of inputs and the number of outputs defined by the specification is compatible (e.g., does not exceed) the number of available inputs and outputs of the particular generator circuit that is implemented within the programmable circuitry of the IC. In another example, the processor is capable of detecting duplicate pin assignments for the inputs and/or the outputs of the generator circuit. In the case of an FSMG, the processor is capable of checking that the number of defined states of the FSM to be implemented by the FSMG, as defined by the specification, is within the limit of allowable states of the FSMG implemented within the IC and as generally described in connection with Table 1.

In block 1015, the processor optionally generates parameterization data for the generator circuit from the specification. In the case of an FSMG that implements a Moore type FSM, the processor is capable of generating the bits used to program the BRAMs, configure the control circuitry, and configure any switches that may be used. Further, the processor is capable of using any of a variety of different encoding techniques such as Gray coding encoding or other suitable encoding schemes. In the case where the FSMG utilizes a BFNG as the output circuit to implement a Mealy type FSM, the processor is further capable of generating the parameterization data necessary to program the BFNG (e.g., the control circuitry, the LUT circuit, and any switches).

In the case where the generator circuit is a BFNG, the processor is capable of generating the parameterization data necessary to parameterize the BFNG. For example, the processor is capable of generating the parameterization data that is provided to the control circuitry for loading into the LUTs and configuring any switches within the BFNG.

In the case where the processor is embedded in the same IC as the generator circuit, the processor is capable of generating the parameterization data used to configure the generator circuit at runtime of the IC and locally within the IC. Thus, the processor is capable of generating the parameterization data within the programmable IC itself without the need for other design tools and/or compilers.

In one or more embodiments, the processor is capable of receiving parameterization data for parameterizing the generator circuit from another source rather than generating the parameterization data from a specification. The parameterization data may be retrieved from a memory or may be received from another system or device such as a remote system or server.

Block 1015 illustrates an example where the generator circuit is parameterized at runtime. In one or more embodiments, the generator circuit, when initially implemented within the programmable IC, may be implemented with a default or initial parameterization that specifies a particular FSM or Boolean function network as the case may be. For example, the configuration bitstream loaded into the programmable IC in block 1005 may include parameterization data (e.g., BRAM contents and other data) that allows the generator circuit to be instantiated within the programmable IC with a default parameterization that allows the generator circuit to implement a particular FSM or Boolean function network without first being parameterized by the processor. This initial or default parameterization may be used for power on conditions and/or reset conditions for the programmable IC.

In block 1020, the processor provides the parameterization data to the generator circuit. For example, the processor is capable of providing the control signals necessary to halt operation of the generator circuit (if already operating) and load the parameterization data into any control registers and/or other circuit structures as described. The parameterization data, for example, may be provided to the control circuitry of the generator circuit. The control circuitry is capable of disseminating the parameterization data to the various circuit elements within the FSMG and/or the BFNG as the case may be.

In block 1025, the generator circuit is parameterized to implement the functionality defined by the specification at runtime of the IC. Having provided the parameterization data to the FSMG and/or the BFNG, the generator circuit is ready, e.g., customized, for operation within the programmable IC. In block 1030, the generator circuit operates independently of the processor. More particularly, the FSMG and/or the BFNG is capable of operating independently of the processor. The processor, for example, is capable of releasing the FSMG and/or the BFNG from the halt state.

In block 1035, the processor determines whether the generator circuit is to be re-parameterized. If so, method 1000 loops back to block 1010 to continue processing. If not, method 1000 loops back to block 1030, where the generator circuit continues to operate independently of the processor.

In one or more embodiments, in response to determining that the generator circuit is to be re-parameterized, the processor may receive parameterization data from another source so that the parameterization data may be loaded into the FSMG and/or the BFNG. In that case, the processor receives parameterization data that may be loaded and need not first generate the parameterization data from a specification. In one or more other embodiments, in response to determining that the generator circuit is to be re-parameterized, the processor is capable of generating further parameterization data from a different specification.

FIG. 10 illustrates an embodiment where the processor may be used to control a feedback loop that selectively implements different FSMs and/or Boolean function networks. The processor may be configured to monitor particular signals and/or data, whether trace data as described, signals from other portions of the IC, signals received from external sources (e.g., off-chip), and/or any combination thereof to detect particular conditions. In response to the conditions, the processor initiates the loading of new and/or different parameterization data into the generator circuit. The processor may be used to iterate through different FSMs and/or Boolean function networks as the case may be.

In one or more other embodiments, the processor may be programmed to evolve and/or refine a specification based upon interaction with one or more internal signals and/or one or more external inputs to the programmable IC. For example, the processor is capable of using trace monitoring circuitry as described herein. Based upon one or more monitored signals, the processor is capable of modifying an existing specification for an FSM and/or a Boolean function network. The processor, for example, may include a machine learning application that is capable of adapting (e.g., changing or modifying) a specification for an FSM and/or a Boolean function network based upon a particular signal or signals monitored by the processor during runtime of the IC.

As an example, the processor is capable of monitoring one or more signals of the FSMG and/or the BFNG. The processor, for example, is capable of monitoring trace data stored in a memory. In response to detecting a particular condition from the trace data, the processor is capable of implementing a different FSM within the FSMG by loading different parameterization data therein. The parameterization data may be obtained from another source or generated by the processor from a selected specification. Similarly, in response to detecting a particular condition from the trace data, the processor is capable of implementing a different function within the BFNG. The parameterization data may be obtained from a different source or generated by the processor from a selected specification.

In another example, the processor may be executing an application that is capable of re-parameterizing the generator circuit. The application may detect an event that is unrelated to monitoring particular signals of the FSMG and/or the BFNG. For example, the event may be a request for a different FSM and/or a different Boolean function network that is received from another system and/or circuit coupled to the processor.

As an illustrative and non-limiting example, an FSMG may be connected to another device through a serial link. The FSMG is capable of receiving data from the device and sending data to the device through the serial link. A processor coupled to the FSMG is capable of evaluating data that is received by the FSMG. The FSM initially implemented by the FSMG, e.g., a first FSM, may be one that assumes that no noise exists and that implements no error correction on the serial link. For example, the processor may be programmed to detect errors on the serial link and implement the first FSM described in response to determining that no errors are detected.

Subsequently, in response to the processor detecting errors on the serial link, the processor may re-parameterize the FSMG to implement a different or second FSM (e.g., a different version of the first FSM that implements error correction). For example, the second FSM may implement 1-bit error correction. The processor may continue to change the FSM implemented by the FSMG to increase the amount of error correction performed in response to continued detection of errors on the serial link. Prior to switching to a different FSM, for example, the FSMG and/or the processor may notify the other device that the particular FSM implemented is to be changed and indicate the type of error correction to be performed by the next FSM.

As another illustrative and non-limiting example, the generator circuit may be controlled by the processor to enable different analysis paths within the IC. The processor may analyze trace data to detect a particular pattern (or use a particular trigger condition). If the pattern is not detected within a specified amount of time, the processor may re-parameterize the generator circuit to search for a different pattern (e.g., a different trigger condition). In this manner, the processor is capable of using time as a trigger condition for re-parameterizing the generator circuit.

In one or more embodiments, the processor is capable of selecting the particular FSM and/or Boolean function network to be implemented within the generator circuit based upon the particular condition that is detected. For example, the processor is capable of storing a plurality of different specifications for different FSMs and/or different Boolean function networks as the case may be. The different specifications may be associated with different conditions or events. In response to detecting a particular event, the processor determines the specification associated with the event and generates parameterization data from the specification. The processor then loads the parameterization data into the generator circuit.

In another example, the processor is capable of implementing a new and/or different FSM and/or Boolean function network at any time, including runtime of the IC. The processor may execute software that, in response to one or more other systems (e.g., live systems) operating in real time enable new FSMs and/or Boolean function networks to be designed and deployed as part of a feedback loop within a system that is programmed to respond to changes in the computing system environment. The inventive arrangements described herein also support the modification of an FSM and/or Boolean function network when implemented as a generator circuit subsequent to release of the programmable IC into the field without having to provide a new configuration bitstream to the programmable IC.

While FIG. 10 describes various scenarios where the parameterization of the generator circuit is performed automatically, in one or more other embodiments, the parameterization of the generator circuit may be performed in response to user requests. For example, the processor, whether embedded or not, may execute development tools that a designer may access and interact with to change the particular FSM and/or Boolean network implemented within the generator circuit at any given time. For example, the user may provide a command to the processor to load a new specification that the processor may process to generate parameterization data that is then provided to the generator circuit. As such, a user is able to design new FSMs and Boolean function networks (or modify existing FSMs and/or Boolean function networks) using software running on the processor.

Figure 11:
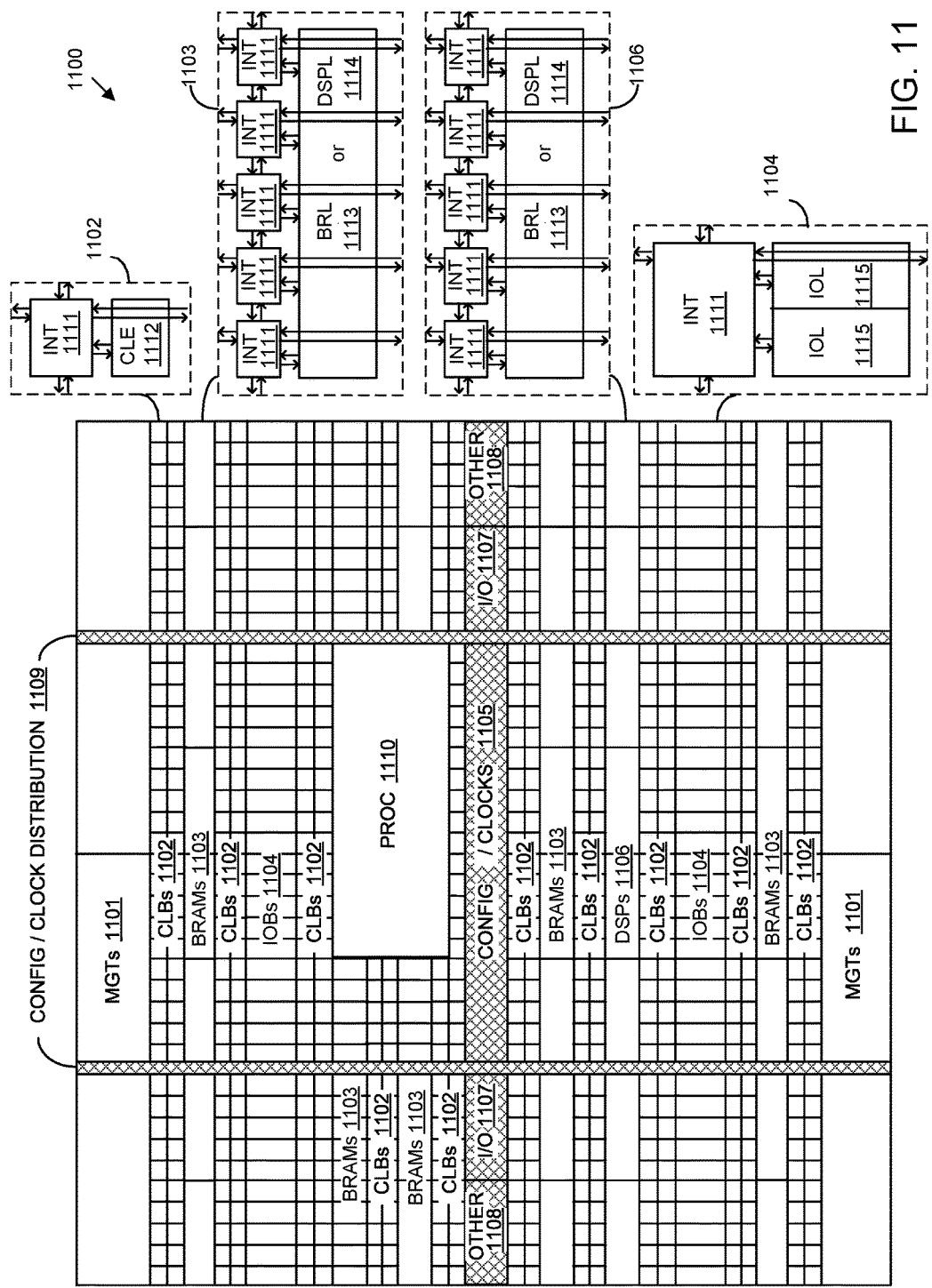
FIG. 11 illustrates an example architecture for an integrated circuit.

FIG. 11 illustrates an example architecture 1100 for an IC. In one aspect, architecture 1100 may be implemented within a programmable IC. For example, architecture 1100 may be used to implement an FPGA. Architecture 1100 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 1100 includes several different types of programmable circuit, e.g., logic, blocks. For example, architecture 1100 may include a large number of different programmable tiles including multi-gigabit transceivers (MGTs) 1101, configurable logic blocks (CLBs) 1102, random access memory blocks (BRAMs) 1103, input/output blocks (IOBs) 1104, configuration and clocking logic (CONFIG/CLOCKS) 1105, digital signal processing blocks (DSPs) 1106, specialized I/O blocks 1107 (e.g., configuration ports and clock ports), and other programmable logic 1108 such as digital clock managers, analog-to-digital converters, system monitoring logic, and so forth.

In some ICs, each programmable tile includes a programmable interconnect element (INT) 1111 having standardized connections to and from a corresponding INT 1111 in each adjacent tile. Therefore, INTs 1111, taken together, implement the programmable interconnect structure for the illustrated IC. Each INT 1111 also includes the connections to and from the programmable logic element within the same tile, as shown by the examples included at the top of FIG. 11.

For example, a CLB 1102 may include a configurable logic element (CLE) 1112 that may be programmed to implement user logic plus a single INT 1111. A BRAM 1103 may include a BRAM logic element (BRL) 1113 in addition to one or more INTs 1111. Typically, the number of INTs 1111 included in a tile depends on the height of the tile. As pictured, a BRAM tile has the same height as five CLBs, but other numbers (e.g., four) also may be used. A DSP tile 1106 may include a DSP logic element (DSPL) 1114 in addition to an appropriate number of INTs 1111. An 10B 1104 may include, for example, two instances of an I/O logic element (IOL) 1115 in addition to one instance of an INT 1111. The actual I/O pads connected to IOL 1115 may not be confined to the area of IOL 1115.

In the example pictured in FIG. 11, a columnar area near the center of the die, e.g., formed of regions 1105, 1107, and 1108, may be used for configuration, clock, and other control logic. Horizontal areas 1109 extending from this column may be used to distribute the clocks and configuration signals across the breadth of the programmable IC.

Some ICs utilizing the architecture illustrated in FIG. 11 include additional logic blocks that disrupt the regular columnar structure making up a large part of the IC. The additional logic blocks may be programmable blocks and/or dedicated circuitry. For example, a processor block depicted as PROC 1110 spans several columns of CLBs and BRAMs.

In one aspect, PROC 1110 may be implemented as dedicated circuitry, e.g., as a hardwired processor, that is fabricated as part of the die that implements the programmable circuitry of the IC. PROC 1110 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1110 may be omitted from architecture 1100 and replaced with one or more of the other varieties of the programmable blocks described. Further, such blocks may be utilized to form a "soft processor" in that the various blocks of programmable circuitry may be used to form a processor that can execute program code as is the case with PROC 1110.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 11 that are external to PROC 1110 such as CLBs 1102 and BRAMs 1103 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1110.

In the case of an SOC, the configuration bitstream may specify the circuitry that is to be implemented within the programmable circuitry and the program code that is to be executed by PROC 1110 or a soft processor. In some cases, architecture 1100 includes a dedicated configuration processor that loads the configuration bitstream to the appropriate configuration memory and/or processor memory. The dedicated configuration processor does not execute user-specified program code. In other cases, architecture 1100 may utilize PROC 1110 to receive the configuration bitstream, load the configuration bitstream into appropriate configuration memory, and/or extract program code for execution.

FIG. 11 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 11 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1110 within the IC are for purposes of illustration only and are not intended as limitations.

In one or more embodiments, a generator circuit as described herein may be implemented in an IC having an architecture as described in connection with FIG. 11. For example, processor 105 may be implemented as PROC 1110. In another example, processor 105 may be implemented as a soft-processor using the programmable circuit blocks described. The generator circuit may also be implemented using the programmable circuit blocks described. BRAMs 1103, for example, may be used to implement the next state circuit and/or the output circuit of FSMG 200. LUTs as may be included in CLBs 1102 may be used to implement the LUT circuit of a BFNG 600.

In one or more embodiments, one or more different generator circuits may be deployed within a same IC. In an example, the generator circuits may operate parallel. In another example, the generator circuits may be serially connected. The generator circuits may be interconnected or operate independently of one another. Further, the particular generator circuits may be heterogeneous, e.g., one or more different FSMGs each implementing an FSM (e.g., a different FSM) and/or one more different BFNGs each implementing a Boolean function network (e.g., a different Boolean function network). In an example implementation, two or more FSMGs may be implemented to interface to a memory device that has a long response latency. A first FSMG in a network of FSMGs may directly interact with the memory, while a second FSMG may implement a counter to manage the longer latency cycles.

In one or more embodiments, one or more FSMGs may be deployed within an IC to control a datapath to create a FSMD (Finite State Machine with Datapath). In the case of an FSMD, the software executed by the processor may be extended with libraries designed for a given FSMD type. The specialization could include more specific methods that are useful when designing with the given FSMD. For example, if an FSMD requires a given initialization sequence, the initialization sequence can be captured and implemented by the library for that FSMD as a high-level macro.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "high-level programming language" (HLL) means a programming language, or set of instructions, used to program a data processing system where the instructions have a strong abstraction from the details of the data processing system, e.g., machine language. For example, a high level programming language may automate or hide aspects of operation of the data processing system such as memory management. Though referred to as "high-level programming languages," these languages are typically classified as "efficiency-level languages" or "ELLs." ELLs expose hardware-supported programming models directly. Examples of high-level programming languages include, but are not limited to, C, C++, and other suitable languages. A program written in an ELL is able to achieve multiple orders of magnitude higher performance than a high-productivity language particularly on emerging parallel hardware.

A high-productivity language (HPL) is a higher-level programming language than the aforementioned HLLs of the ELL variety. Characteristics of an HPL include, but are not limited to, being implemented as a scripting language. In another example, an HPL can be implemented as an extension language. Some HPLs are domain-specific, while others are not. HPLs provide abstractions that are suited or well-matched to the particular domain of that HPL. HPLs focus on programmer productivity as opposed to hardware efficiency. HPLs may provide utilities for debugging and visualization that are useful for domain experts, but lack support for taking advantage of lower level hardware functions such as parallel processing in systems. Examples of an HPL include, but are not limited to, Python, Scala, and R.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, whether a special purpose computer or other programmable data processing apparatus, to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to systems. A system can include a finite state machine generator implemented in programmable circuitry of an integrated circuit. The finite state machine generator is parameterizable to implement different finite state machines at runtime of the integrated circuit. The system can include a processor configured to execute program code. The processor is configured to provide first parameterization data to the finite state machine generator at runtime of the integrated circuit. The first parameterization data specifies a first finite state machine and the finite state machine generator implements the first finite state machine in response to receiving the first parameterization data from the processor.

In an aspect, the processor is configured to generate the first parameterization data for the first finite state machine from a finite state machine specification.

In another aspect, the processor is configured to provide second parameterization data to the finite state machine generator at runtime of the integrated circuit. The finite state machine generator implements a second finite state machine in response to receiving the second parameterization data from the processor.

In another aspect, the processor provides the second parameterization data to the finite state machine generator in response to a condition detected using the first finite state machine.

In another aspect, the finite state machine generator includes multiplexer circuitry configurable at runtime of the integrated circuit to pass a selected number of finite state machine inputs and a selected number of bits of a state vector based upon the first parameterization data.

In another aspect, the finite state machine generator includes a next state circuit coupled to the multiplexer circuitry and configured to determine next states of the first finite state machine based upon the selected number of finite state machine inputs and the selected number of bits of the state vector. The finite state machine generator can also include an output circuit coupled to the multiplexer circuitry and configured to generate finite state machine outputs based upon the selected number of finite state machine inputs and the selected number of bits of the state vector.

In another aspect, the next state circuit and the output circuit are implemented using a block random access memory.

In another aspect, the next state circuit is implemented using a memory and the output circuit is implemented using a Boolean function network generator.

In another aspect, the Boolean function network generator is parameterizable to implement different Boolean function networks at runtime of the integrated circuit.

In another aspect, the finite state machine generator includes a switch coupled to a plurality of nodes of the integrated circuit, wherein the switch is parameterizable at runtime of the integrated circuit to couple first subset of the nodes to the selected number of finite state machine inputs and a second subset of the nodes to the finite state machine outputs.

In another aspect, the finite state machine generator includes a trace buffer coupled to the nodes and configured to store values of signals on the nodes as trace data and a direct memory access circuit configured to transfer the trace data from the trace buffer to a read-write memory.

In another aspect, the processor is further configured to read the trace data from the read-write memory.

In another aspect, the processor is configured to provide second parameterization data to the finite state machine generator at runtime of the integrated circuit in response to detecting a condition in the trace data, wherein the second parameterization data parameterizes the finite state machine generator to implement a second finite state machine.

In another aspect, the system includes a clock control circuit configured to control clocking of the finite state machine generator.

One or more embodiments are directed to methods. A method can include implementing a finite state machine generator within programmable circuitry of an integrated circuit and receiving, at the finite state machine generator, first parameterization data at runtime of the integrated circuit. The first parameterization data specifies a first finite state machine. The method can include implementing the first finite state machine within the finite state machine generator at runtime of the integrated circuit in response to parameterizing the finite state machine generator using the first parameterization data.

In an aspect, the method can include implementing a second finite state machine within the finite state machine generator at runtime of the integrated circuit in response to parameterizing the finite state machine generator using second parameterization data specifying the second finite state machine.

In another aspect, a processor initiates implementation of the second finite state machine within the finite state machine generator in response to a detected condition.

In another aspect, the condition is detected from an input or an output of the first finite state machine.

In another aspect, the method can include generating, using a processor, the first parameterization data from a finite state machine specification.

In another aspect, the method can include including a number of dummy states within the first finite state machine following a reset state that depends upon a level of pipelining within the finite state machine generator.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A system, comprising:
a finite state machine generator implemented in programmable circuitry of an integrated circuit, wherein the finite state machine generator is parameterizable to implement different finite state machines at runtime of the integrated circuit; and a processor configured to execute program code, wherein the processor is configured to provide first parameterization data to the finite state machine generator at runtime of the integrated circuit;

wherein the first parameterization data specifies a first finite state machine and the finite state machine generator implements the first finite state machine in response to receiving the first parameterization data from the processor; and wherein the finite state machine generator comprises multiplexer circuitry configurable at runtime of the integrated circuit to pass a selected number of finite state machine inputs and a selected number of bits of a state vector based upon the first parameterization data.

2. The system of claim 1, wherein the processor is configured to generate the first parameterization data for the first finite state machine from a finite state machine specification.

3. The system of claim 1, wherein:

the processor is configured to provide second parameterization data to the finite state machine generator at runtime of the integrated circuit; and the finite state machine generator implements a second finite state machine in response to receiving the second parameterization data from the processor.

4. The system of claim 3, wherein the processor provides the second parameterization data to the finite state machine generator in response to a condition detected using the first finite state machine.

5. The system of claim 1, wherein the finite state machine generator comprises:

a next state circuit coupled to the multiplexer circuitry and configured to determine next states of the first finite state machine based upon the selected number of finite state machine inputs and the selected number of bits of the state vector; and an output circuit coupled to the multiplexer circuitry and configured to generate finite state machine outputs based upon the selected number of finite state machine inputs and the selected number of bits of the state vector.

6. The system of claim 5, wherein the next state circuit and the output circuit are implemented using a block random access memory.

7. The system of claim 5, wherein the next state circuit is implemented using a memory and the output circuit is implemented using a Boolean function network generator.

8. The system of claim 7, wherein the Boolean function network generator is parameterizable to implement different Boolean function networks at runtime of the integrated circuit.

9. The system of claim 5, wherein the finite state machine generator further comprises:

a switch coupled to a plurality of nodes of the integrated circuit, wherein the switch is parameterizable at runtime of the integrated circuit to couple a first subset of the plurality of nodes to the selected number of finite state machine inputs and a second subset of the plurality of nodes to the finite state machine outputs.

10. The system of claim 9, wherein the finite state machine generator further comprises:

a trace buffer coupled to the nodes and configured to store values of signals on the nodes as trace data; and a direct memory access circuit configured to transfer the trace data from the trace buffer to a read-write memory.

11. The system of claim 10, wherein the processor is further configured to read the trace data from the read-write memory.

12. The system of claim 11, wherein the processor is configured to provide second parameterization data to the finite state machine generator at runtime of the integrated circuit in response to detecting a condition in the trace data, wherein the second parameterization data parameterizes the finite state machine generator to implement a second finite state machine.

13. The system of claim 1, further comprising:

a clock control circuit configured to control clocking of the finite state machine generator.

14. A method, comprising:

implementing a finite state machine generator within programmable circuitry of an integrated circuit; and receiving, at the finite state machine generator, first parameterization data at runtime of the integrated circuit, wherein the first parameterization data specifies a first finite state machine;

implementing the first finite state machine within the finite state machine generator at runtime of the integrated circuit in response to parameterizing the finite state machine generator using the first parameterization data; and configuring multiplexer circuitry of the finite state machine generator at runtime to pass a selected number of finite state machine inputs and a selected number of bits of a state vector based upon the first parameterization data.

15. The method of claim 14, further comprising:

implementing a second finite state machine within the finite state machine generator at runtime of the integrated circuit in response to parameterizing the finite state machine generator using second parameterization data specifying the second finite state machine.

16. The method of claim 15, wherein a processor initiates implementation of the second finite state machine within the finite state machine generator in response to a detected condition.

17. The method of claim 16, wherein the condition is detected from an input or an output of the first finite state machine.

18. The method of claim 14, further comprising:

generating, using a processor, the first parameterization data from a finite state machine specification.

19. The method of claim 18, further comprising:

including a number of dummy states within the first finite state machine following a reset state that depends upon a level of pipelining within the finite state machine generator.

20. An integrated circuit, comprising:

programmable circuitry;

a finite state machine generator implemented in the programmable circuitry, wherein the finite state machine generator is parameterizable to implement different finite state machines at runtime of the integrated circuit;

wherein the finite state machine generator, in response to receiving first parameterization data specifying a first finite state machine at runtime, implements the first finite state machine; and wherein the first finite state machine includes a number of dummy states following a reset state that depends upon a level of pipelining within the finite state machine generator.

* * * * *